(12) United States Patent
Hormis et al.

(10) Patent No.: US 10,608,678 B1
(45) Date of Patent: Mar. 31, 2020

(54) BIDIRECTIONAL REPEATERS FOR TIME DIVISION DUPLEXED MILLIMETER WAVE SYSTEMS

(71) Applicant: QUALCOMM Incorporated, San Diego, CA (US)

(72) Inventors: Raju Hormis, New York, NY (US); Navid Abedini, Somerset, NJ (US); Junyi Li, Chester, NJ (US); Juergen Cezanne, Ocean Township, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/428,642

(22) Filed: May 31, 2019

(51) Int. Cl.
| | | |
|---|---|---|
| *H04B 1/00* | (2006.01) | |
| *H04L 5/14* | (2006.01) | |
| *H01Q 21/30* | (2006.01) | |
| *H04B 1/401* | (2015.01) | |
| *H04B 7/06* | (2006.01) | |
| *H04B 7/155* | (2006.01) | |

(52) U.S. Cl.
CPC .......... *H04B 1/006* (2013.01); *H01Q 21/30* (2013.01); *H04B 1/0057* (2013.01); *H04B 1/401* (2013.01); *H04B 7/0617* (2013.01); *H04B 7/15535* (2013.01); *H04L 5/14* (2013.01)

(58) Field of Classification Search
CPC ...... H04B 1/006; H04B 1/0057; H04B 1/401; H04B 7/0617; H04B 7/15535; H04L 5/14; H04L 1/0003; H04L 1/0071; H04L 5/0007; H04L 1/0009; H04L 27/0008; H01Q 21/30
See application file for complete search history.

(56) References Cited

U.S. PATENT DOCUMENTS

2012/0299765 A1\* 11/2012 Huang ................ H01Q 3/24 342/81
2019/0238283 A1\* 8/2019 Liu ................ H04B 7/0417
2019/0260442 A1\* 8/2019 Clifton ............... H04B 7/0602

\* cited by examiner

*Primary Examiner* — Ted M Wang
(74) *Attorney, Agent, or Firm* — Holland & Hart LLP

(57) ABSTRACT

Methods, systems, and devices for wireless communications are described. A bidirectional wireless repeater may receive a first waveform during a first time domain duplexing period via a first antenna array and may transmit the first waveform at a second antenna array during the first time domain duplexing period. A di-pole di-throw (DPDT) switch may be coupled to the first and second antenna arrays and may switch the arrays during a guard period between the first time domain duplexing period and a second time domain duplexing period. The DPDT switch may toggle the first and second antenna arrays between transmit and receive modes.

32 Claims, 16 Drawing Sheets

BIDIRECTIONAL REPEATERS FOR TIME DIVISION DUPLEXED MILLIMETER WAVE SYSTEMS

BACKGROUND

The following relates generally to wireless communications, and to bidirectional repeaters for time division duplexed millimeter wave (mmW) systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communications system may transmit and receive wireless signals between base stations and UEs. In some examples, after transmission from the base station or UE, the integrity of the wireless signal may be degraded due to interference effects within the transmitting device or path attenuation, and the wireless signal may not be received at its intended target. In some examples, wireless signals may be limited by path loss or path attenuation through the air, physical blockers, or other constraints. In such examples, wireless repeaters may be implemented for repeating and extending signals received from base stations to UEs and from UEs to base stations.

SUMMARY

The described techniques relate to improved methods, systems, devices, and apparatuses that support bidirectional repeaters. Generally, the described techniques provide a bidirectional repeater for simultaneously transmitting signals at a first antenna array and receiving signals at a second antenna array. The bidirectional repeater may be configured to switch both the first antenna array and the second antenna array, using a di-pole di-throw (DPDT) switch, and during a guard period resulting from downlink to uplink switching (or vice versa) in time division duplexing. The bidirectional repeater may receive a sideband message from a base station which may provide the timing of the guard period. The DPDT switch may then be activated during the guard period to switch each of the first and second antenna arrays between transmitting and receiving (e.g., downlink and uplink or vice versa). The bidirectional repeater may be configured to apply different phase shifts to the first and second antenna array to implement different beamforming configurations, thus increasing the coverage area and improving signal quality by providing more targeted beam directions.

A method of wireless communications at a wireless repeater is described. The method may include receiving, at a first antenna array of the wireless repeater, a first waveform during a first time domain duplexing period, transmitting, at a second antenna array of the wireless repeater, the first waveform during the first time domain duplexing period, where the first antenna array includes a first beamforming configuration and the second antenna array includes a second beamforming configuration, controlling a di-pole di-throw (DPDT) switch coupled to the first antenna array and the second antenna array during a guard period between the first time domain duplexing period and a second time domain duplexing period, where controlling the DPDT switch toggles the first antenna array from a transmit configuration to a receive configuration and the second antenna array from the receive configuration to the transmit configuration, receiving, at the second antenna array, a second waveform during the second time domain duplexing period, and transmitting, at the first antenna array, the second waveform during the second time domain duplexing period.

An apparatus for wireless communications at a wireless repeater is described. The apparatus may include a processor, memory in electronic communication with the processor, and instructions stored in the memory. The instructions may be executable by the processor to cause the apparatus to receive, at a first antenna array of the wireless repeater, a first waveform during a first time domain duplexing period, transmit, at a second antenna array of the wireless repeater, the first waveform during the first time domain duplexing period, where the first antenna array includes a first beamforming configuration and the second antenna array includes a second beamforming configuration, control a di-pole di-throw (DPDT) switch coupled to the first antenna array and the second antenna array during a guard period between the first time domain duplexing period and a second time domain duplexing period, where controlling the DPDT switch toggles the first antenna array from a transmit configuration to a receive configuration and the second antenna array from the receive configuration to the transmit configuration, receive, at the second antenna array, a second waveform during the second time domain duplexing period, and transmit, at the first antenna array, the second waveform during the second time domain duplexing period.

Another apparatus for wireless communications at a wireless repeater is described. The apparatus may include means for receiving, at a first antenna array of the wireless repeater, a first waveform during a first time domain duplexing period, transmitting, at a second antenna array of the wireless repeater, the first waveform during the first time domain duplexing period, where the first antenna array includes a first beamforming configuration and the second antenna array includes a second beamforming configuration, means for controlling a di-pole di-throw (DPDT) switch coupled to the first antenna array and the second antenna array during a guard period between the first time domain duplexing period and a second time domain duplexing period, where controlling the DPDT switch toggles the first antenna array from a transmit configuration to a receive configuration and the second antenna array from the receive configuration to the transmit configuration, means for receiving, at the second antenna array, a second waveform during the second time domain duplexing period, and means for transmitting, at the first antenna array, the second waveform during the second time domain duplexing period.

A non-transitory computer-readable medium storing code for wireless communications at a wireless repeater is described. The code may include instructions executable by a processor to receive, at a first antenna array of the wireless repeater, a first waveform during a first time domain duplexing period, transmit, at a second antenna array of the wireless repeater, the first waveform during the first time domain duplexing period, where the first antenna array includes a first beamforming configuration and the second antenna array includes a second beamforming configuration, control a di-pole di-throw (DPDT) switch coupled to the first antenna array and the second antenna array during a guard period between the first time domain duplexing period and a second time domain duplexing period, where controlling the DPDT switch toggles the first antenna array from a transmit configuration to a receive configuration and the second antenna array from the receive configuration to the transmit configuration, receive, at the second antenna array, a second waveform during the second time domain duplexing period, and transmit, at the first antenna array, the second waveform during the second time domain duplexing period.

Some examples of the method, apparatuses, and non-transitory computer-readable medium described herein may further include operations, features, means, or instructions for applying a first set of phase shifts to implement the first beamforming configuration, and applying a second set of phase shifts to implement the second beamforming configuration.

In some examples of the method, apparatuses, and non-transitory computer-readable medium described herein, controlling the DPDT switch may include operations, features, means, or instructions for controlling a set of DPDT switches, where each DPDT switch may be disposed between a first corresponding antenna of the first antenna array and a second corresponding antenna of the second antenna array.

In some examples of the method, apparatuses, and non-transitory computer-readable medium described herein, receiving the first waveform may include operations, features, means, or instructions for combining a set of input signals corresponding to the first antenna array, where the combining occurs after routing the set of inputs through the set of DPDT switches and applying the first set of phase shifts to the set of input signals.

In some examples of the method, apparatuses, and non-transitory computer-readable medium described herein, transmitting the first waveform may include operations, features, means, or instructions for dividing the first waveform into a set of output signals, applying the second set of phase shifts to the set of output signals, and routing the set of output signals through the set of DPDT switches to the second antenna array.

In some examples of the method, apparatuses, and non-transitory computer-readable medium described herein, receiving the second waveform may include operations, features, means, or instructions for combining a set of input signals corresponding to the second antenna array, where the combining occurs after routing the set of input signals through the set of DPDT switches and applying the second set of phase shifts to the set of input signals.

In some examples of the method, apparatuses, and non-transitory computer-readable medium described herein, transmitting the second waveform may include operations, features, means, or instructions for dividing the second waveform into a set of output signals, applying the first set of phase shifts to the set of output signals, and routing the set of output signals through the set of DPDT switches to the first antenna array.

In some examples of the method, apparatuses, and non-transitory computer-readable medium described herein, receiving the first waveform may include operations, features, means, or instructions for applying the first set of phase shifts to a set of input signals corresponding to the first antenna array, and combining the set of input signals between the first antenna array and the DPDT switch.

In some examples of the method, apparatuses, and non-transitory computer-readable medium described herein, transmitting the first waveform may include operations, features, means, or instructions for dividing the first waveform into a set of output signals corresponding to the second antenna array, where the dividing occurs between the DPDT switch and the second antenna array, and applying the second set of phase shifts to the set of output signals.

In some examples of the method, apparatuses, and non-transitory computer-readable medium described herein, receiving the second waveform may include operations, features, means, or instructions for applying the first set of phase shifts to a set of input signals corresponding to the second antenna array, and combining the set of input signals, where the combining occurs between the second antenna array and the DPDT switch.

In some examples of the method, apparatuses, and non-transitory computer-readable medium described herein, transmitting the second waveform may include operations, features, means, or instructions for dividing the second waveform into a set of output signals corresponding to the first antenna array, where the dividing occurs between the DPDT switch and the first antenna array, and applying the second set of phase shifts to the set of output signals.

Some examples of the method, apparatuses, and non-transitory computer-readable medium described herein may further include operations, features, means, or instructions for applying a set of phase shifts to the first waveform and the second waveform, where the set of phase shifts may be applied between the first antenna array and the second antenna array, and where the set of phase shifts may be based on a net angle difference between the first beamforming configuration and the second beamforming configuration.

In some examples of the method, apparatuses, and non-transitory computer-readable medium described herein, controlling the DPDT switch may include operations, features, means, or instructions for controlling a set of DPDT switches, where each DPDT switch may be disposed between a first corresponding antenna of the first antenna array and a second corresponding antenna of the second antenna array, and where applying the set of phase shifts occurs between a first node of each DPDT switch and a second node of each DPDT switch.

In some examples of the method, apparatuses, and non-transitory computer-readable medium described herein, controlling the DPDT switch may include operations, features, means, or instructions for receiving a sideband message from a base station indicating a timing of the guard period, and activating the DPDT switch based on the sideband message.

Some examples of the method, apparatuses, and non-transitory computer-readable medium described herein may further include operations, features, means, or instructions for amplifying the first waveform and the second waveform between a first node of the DPDT switch and second node of the DPDT switch.

In some examples of the method, apparatuses, and non-transitory computer-readable medium described herein, amplifying the first waveform and the second waveform between the first node of the DPDT switch and the second node of the DPDT switch may include operations, features, means, or instructions for, and passing the first waveform and the second waveform through one or more of: a low noise amplifier stage, a power amplifier driver stage, or a power amplifier stage.

A wireless repeater is described. The wireless repeater includes a first antenna array comprising a first beamforming configuration, a second antenna array comprising a second beamforming configuration, a di-pole di-throw (DPDT) switch coupled to the first antenna array and the second antenna array, and a controller coupled to the DPDT switch. The controller may be configured to control the DPDT switch to toggle the first antenna array from a transmit configuration to a receive configuration and the second antenna array from the receive configuration to the transmit configuration, wherein the DPDT switch is controlled during a guard period between a first time domain duplexing period and a second time domain duplexing period.

In some examples of the wireless repeater, a set of phase shifters may be configured to apply a set of phase shifts to a plurality of input signals corresponding to the first antenna array, and the set of phase shifts is applied to the plurality of input signals after passing through the DPDT switch.

In some examples of the wireless repeater, a combiner may be coupled with a phase shifter of the set of phase shifters, and the combiner may be configured to combine the plurality of input signals corresponding to the first antenna array to produce a waveform, and the combining occurs after passing through the DPDT switch and applying the set of phase shifts to the plurality of input signals.

In some examples of the wireless repeater, a divider may be coupled with the combiner, and the divider may be configured to divide the waveform into a plurality of output signals.

In some examples of the wireless repeater, a second set of phase shifters may be coupled with the divider, and the second set of phase shifters may be configured to apply a second set of phase shifts to the plurality of input signals, and the second set of phase shifters may be further configured to pass the plurality of input signals to the DPDT switch and to the second antenna array.

In some examples of the wireless repeater, a set of phase shifters may be configured to apply a set of phase shifts to a plurality of input signals corresponding to the first antenna array, and the set of phase shifts may be applied to the plurality of input signals before passing through the DPDT switch.

In some examples of the wireless repeater, the set of phase shifters may be further configured to apply a second set of phase shifts to a plurality of output signals, and the second set of phase shifts may be applied to the plurality of output signals after passing through the DPDT switch.

In some examples of the wireless repeater, the wireless repeater may include a combiner coupled with the set of phase shifters and configured to combine the plurality of input signals to produce a waveform before passing the waveform to the DPDT switch.

In some examples of the wireless repeater, the combiner may be further configured to divide the waveform into a plurality of output signals after passing through the DPDT switch.

In some examples of the wireless repeater, the first antenna array comprises a first beamforming configuration and the second antenna array comprises a second beamforming configuration.

In some examples of the wireless repeater, the wireless repeater may include a set of phase shifters configured to apply a set of phase shifts to a plurality of input signals corresponding to the first antenna array, and the set of phase shifts may be applied between the first antenna array and the second antenna array, and the set of phase shifts may be based at least in part on a net angle difference between the first beamforming configuration and the second beamforming configuration.

In some examples of the wireless repeater, the wireless repeater may include a power amplifier coupled with the DPDT switch, and the power amplifier may be configured to amplify a plurality of output signals corresponding to the second antenna array, and the power amplifier may amplify the plurality of output signals before passing through the DPDT switch.

In some examples of the wireless repeater, the wireless repeater may include a power amplifier coupled with the DPDT switch, and the power amplifier may be configured to amplify a first waveform corresponding to the first antenna array, and the power amplifier may amplify the first waveform after passing through the DPDT switch.

In some examples of the wireless repeater, the wireless repeater may include a low noise amplifier coupled with the DPDT switch, and the low noise amplifier may be configured amplify a plurality of input signals corresponding to the first antenna array, and the low noise amplifier may amplify the plurality of input signals after the plurality of input signals pass through the DPDT switch.

DETAILED DESCRIPTION

Figure 1:
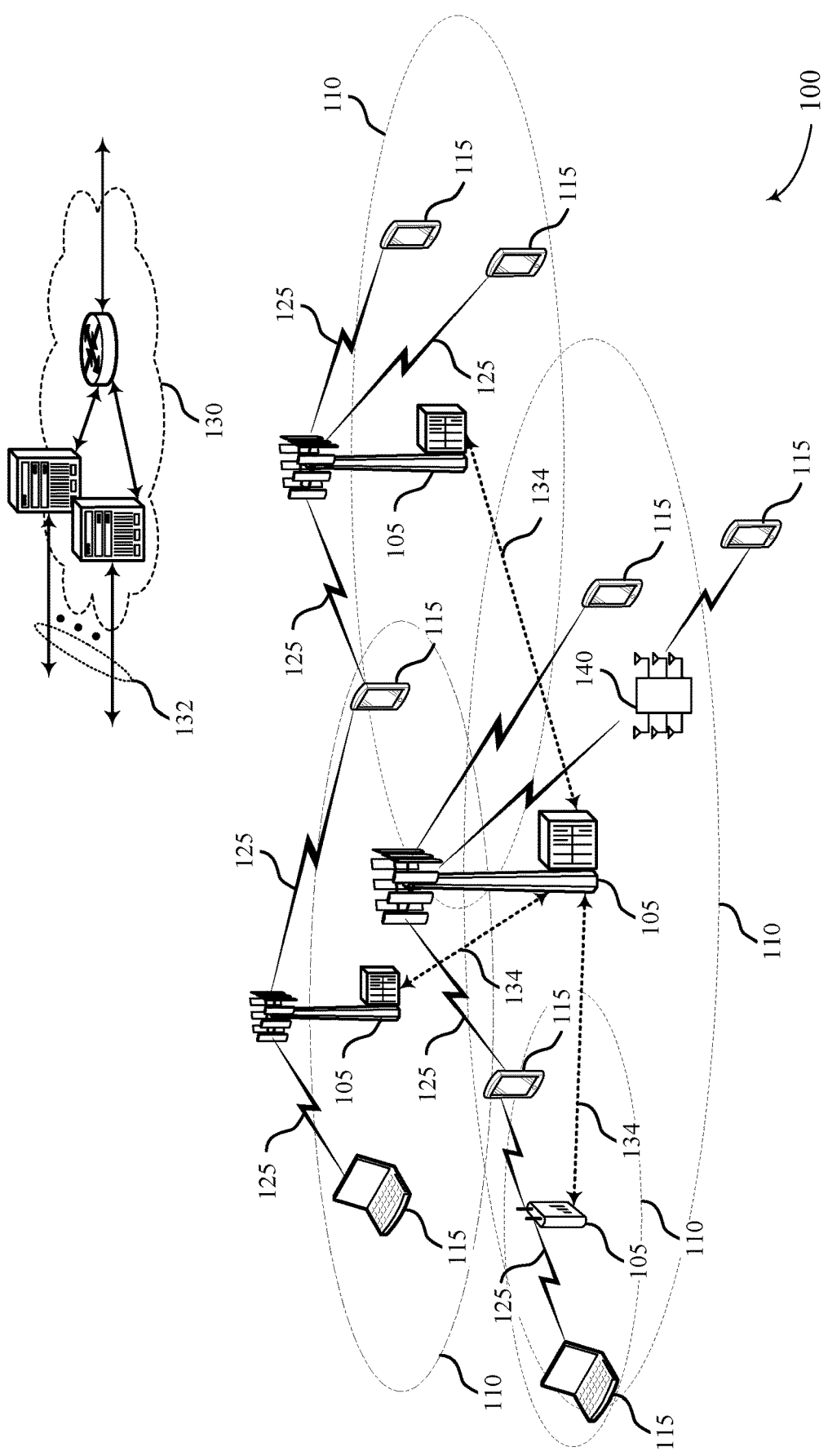
FIG. 1 illustrates an example of a system for wireless communications that supports bidirectional repeaters for time division duplexed millimeter wave systems in accordance with aspects of the present disclosure.

Wireless communications systems may use varying frequency ranges or bandwidths for communicating wireless signals between base stations and UEs. Signals transmitted by the base station and UE may be in different frequency ranges and may have varying signal degradation depending on the frequency range. In some examples, the signals may be transmitted via a relatively low frequency which may be received without degradation. Signals communicated via a relatively low frequency may more easily propagate through physical structures such as trees, walls, or windows, but may experience more degradation as the frequency is higher. In some examples, the signals may be transmitted by the base station to the UE (or vice versa) via a high frequency, such as a frequency in the millimeter wave (mmW) band, and may lack a direct line of sight between the base station and UE. This may cause signal degradation as physical structures such as trees, walls, or windows and even air may attenuate the signal.

In some examples, a wireless repeater may repeat, extend, and/or direct wireless signals received from a base station to a UE and/or from the UE to a base station. Many wireless repeaters have a first dedicated antenna array for transmitting and a second dedicated antenna array for receiving. Because a UE and a base station alternate between transmitting and receiving operations during time domain duplexing, a wireless repeater may have to reconfigure beamforming for the transmitting antenna array and the receiving antenna array with each TDD cycle. This reconfiguration of beamforming for each antenna array introduces delay and complexity into the repeating process, and can detrimentally affect the performance, complexity, and price of the wireless repeater.

According to the principles of the present disclosure, reconfiguration of beamforming for each antenna array of a wireless repeater can be avoided if a di-pole di-throw (DPDT) switch is placed between the transmit and receive chains of the repeater and each antenna array. Each antenna array may then be dedicated to either the UE or the base station, and beamforming may be configured for that specific device. The DPDT switch may quickly switch the transmit and receive chains between the first and second antenna arrays during guard periods of a time domain duplexing cycle, enabling the beamforming configurations to remain the same for each antenna array throughout the entire time domain duplexing cycle.

In some examples, a bidirectional repeater may simultaneously receive a signal from a base station and transmit the signal to a UE and may receive a signal from a UE and transmit the signal to the base station at approximately the same time. The bidirectional repeater may transmit and receive the signals via at least a first antenna array and a second antenna array which may be switched from transmit to receive or vice versa via a di-pole di-throw (DPDT) switch. The wireless repeater may receive the downlink/uplink control information from the base station and may coordinate the switching of the antenna arrays with a time division duplex (TDD) guard period at the base station. The TDD guard period may be a duration of time in which the base station may switch from the downlink to uplink or vice versa. The DPDT switch of the bidirectional repeater may simultaneously switch multiple antenna arrays between transmit and receive modes and between receive and transmit modes simultaneously.

Aspects of the disclosure are initially described in the context of a wireless communications system. Aspects of the disclosure are further described in the context of block diagrams of a wireless repeater and a process flow diagram. Aspects of the disclosure are further illustrated by and described with reference to apparatus diagrams, system diagrams, and flowcharts that relate to bidirectional repeaters for time division duplexed millimeter wave systems.

FIG. 1 illustrates an example of a wireless communications system 100 that supports bidirectional phased-array repeaters for TDD mmW systems in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power or frequency resource consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may include one or more bidirectional repeaters 140. The bidirectional repeater 140 may receive signals from a base station and/or UE and may transmit the signal on to the UE and/or base station. In some examples, the transmit and receive paths of the bidirectional repeater 140 may both remain active at the same time, which may allow for an increased coverage area when compared with the coverage area of merely changing the beam-forming scan angle.

In some cases, the bidirectional repeater 140 may be used in line of site (LOS) or non-line of sight (NLOS) scenarios. In a NLOS scenario, such as in an urban area or indoors, mmW transmissions may be limited by signal blocking or signal interfering physical objects such as buildings, walls, trees, etc. A bidirectional repeater 140 with beamforming capabilities may be utilized to receive a signal from a base station 105 and transmit the signal to the UE 115 and/or receive a signal from a UE 115 and transmit the signal to the base station 105 at the same time. In some examples, the bidirectional repeater 140 may further include a beam control system, which may comprise a system on chip (SoC) for controlling transmit and/or receive beams to reduce signal interference caused by receiving and transmitting at approximately the same time.

The bidirectional repeater 140 may include multiple antenna arrays. In some cases, the first and second array of antennas may be phased-array antennas and may be simultaneously switched by a DPDT switch. The DPDT switch may be receive the downlink/uplink control information from the base station and may be coordinate the switching of the antenna arrays with a time division duplex (TDD) guard period at the base station. The TDD guard period may be a duration of time in which the base station may switch from the downlink to uplink or vice versa. The DPDT switch of the bidirectional repeater 140 may simultaneously switch multiple antenna arrays between transmit and receive modes and between receive and transmit modes simultaneously. In some examples, there may be multiple DPDT switches, each of which correspond to an antenna array. In some examples, one DPDT switch may switch multiple antenna arrays.

In some examples and depending on the implementation of the bidirectional repeater 140, the bidirectional repeater 140 may further include a beam control system, which may comprise a system on chip (SoC) for controlling transmit and/or receive beams to reduce signal interference caused by retransmission. The beam control may be implemented using phase shifters to implement a first beamforming configuration which may correspond to a first set of antenna arrays and to additionally, implement a second beamforming configuration which may correspond to a second set of antenna arrays.

In some examples, because the bidirectional repeater 140 may include simultaneously active transmit and receive paths, the repeater system cost may be lower due to the ability to operate in uplink and downlink modes with one repeater as opposed to two separate repeaters operating in uplink and downlink. Further, the bidirectional repeater 140 may reduce the system latency due to the simultaneous transmission and reception capabilities. In some examples, because the bidirectional repeater 140 maintains the same field of view with each set of antennas while switching between uplink and downlink, the coverage area may be larger in comparison to a unidirectional repeater that can only change its beamforming scan angle to target the base station 105 and the UE 115.

Figure 2:
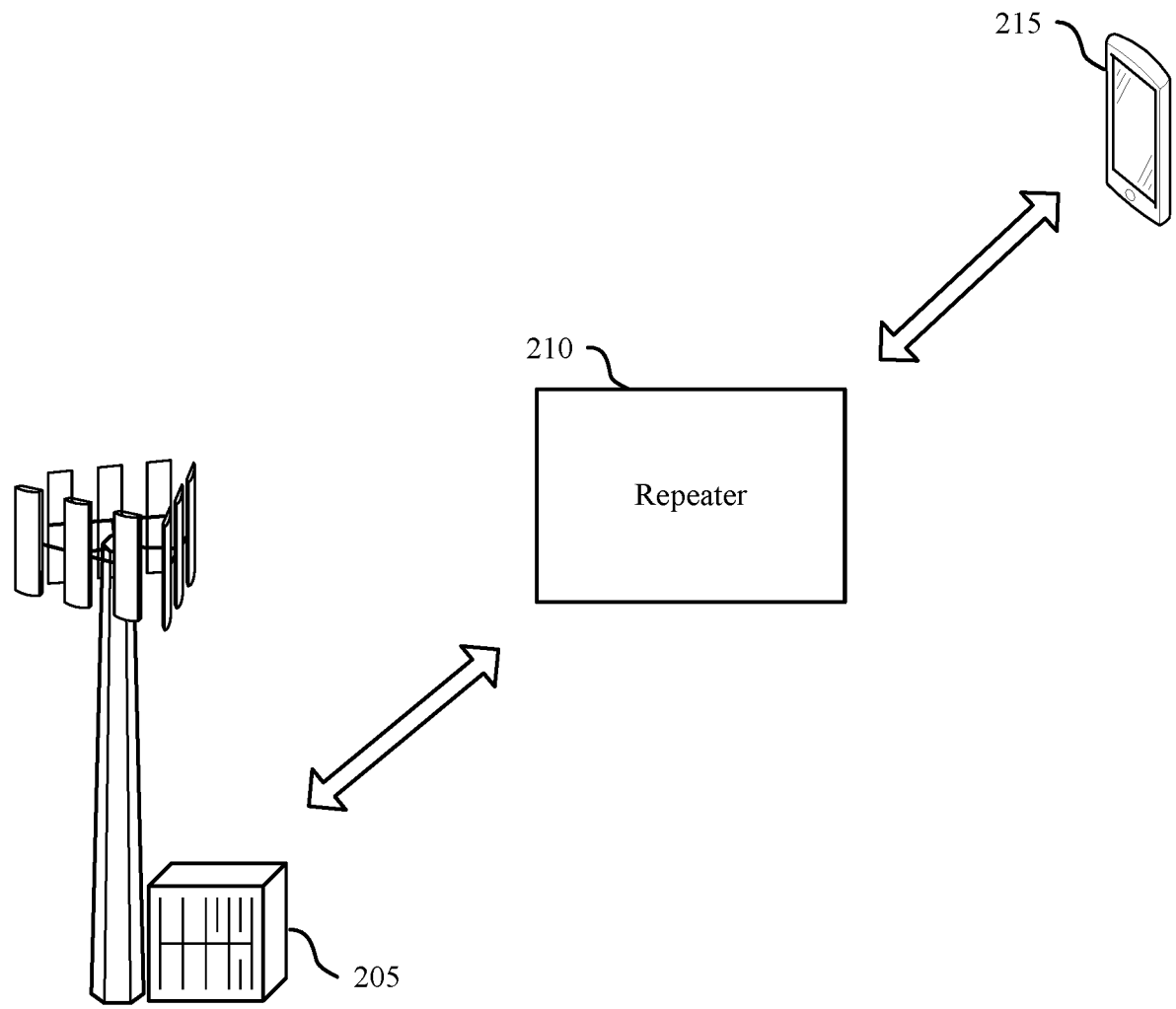
FIG. 2 illustrates an example of a wireless communications system that supports bidirectional repeaters for time division duplexed millimeter wave systems in accordance with aspects of the present disclosure.

FIG. 2 illustrates an example of a wireless communications system 200 of a bidirectional repeater 210 in accordance with aspects of the present disclosure. In some examples, the wireless communications system 200 of FIG. 2 may implement aspects of the wireless communications system 100 of FIG. 1, and the bidirectional repeater 210 may be an example of the bidirectional repeater 140 of FIG. 1. The wireless communications system 200 includes a base station 205 and a UE 215 which may be examples of the base station 105 and the UE 115 of FIG. 1.

As illustrated in FIG. 2, the base station 205 may be transmitting and receiving signals to and from a UE 215 via a bidirectional repeater 210 and the UE may be transmitting and receiving signals to and from the base station 205 via the bidirectional repeater 210. Although only a single base station 205 and a single UE 215 are depicted in FIG. 2, multiple base stations 205 and multiple UEs 215 may transmit and receive signals via the bidirectional repeater 210. In FIG. 2, communications from the base station 205 may not reach the UE 215 due to path loss or path attenuation, and the signal strength may not be sufficient to reach the UE 215 without the bidirectional repeater 210. In some examples, the path attenuation may be due to physical structures such as trees, walls, buildings, air, and so forth. Path attenuation may be dependent on the frequency range used for the communications which will be discussed in further detail herein. In some examples, the base station 205 may transmit and receive signals from the UE 215 without the signals passing through the bidirectional repeater 210.

The bidirectional repeater 210 may transmit or receive signals from the base station 205 via a first antenna array or a first set of antennas and may transmit or receive signals from the UE 215 via a second antenna array or a second set of antennas. The first set of antennas may include one or more antennas and the second set of antennas may include one or more antennas. The bidirectional repeater 210 may function to implement uplink and downlink communications between the base station 205 and the UE 215. In some examples, the bidirectional repeater 210 may receive signals from the base station 205 according to a first beamforming configuration and may transmit the signals to the UE 215 according to a second beamforming configuration. Additionally, the bidirectional repeater 210 may further receive signals from the UE 215 according to the first beamforming configuration and may transmit the signals to the UE 215 according to a second beamforming configuration. In some examples, the base station 205 may transmit beamforming configurations based on the operating environment, position of the UE 215, and/or the configuration of the UE 215.

In some examples, the bidirectional repeater 210 may transmit and receive signals simultaneously. The bidirectional repeater 210 may include a switch which may toggle the first antenna array from transmit to receive and vice versa and may also toggle the second antenna array from transmit to receive and vice versa. In some examples, the switch may be a DPDT switch which may receive the timing from a gNodeB via a sub-6 GHz RF channel as discussed in detail herein. The gNodeB may provide the timing of the TDD guard period so that the DPDT switch may toggle the antenna arrays from transmit to receive or vice versa approximately at the same time as the TDD guard period. The DPDT switch is discussed in further detail herein. In some examples, one example of the base station may be a gNodeB.

Figure 3:
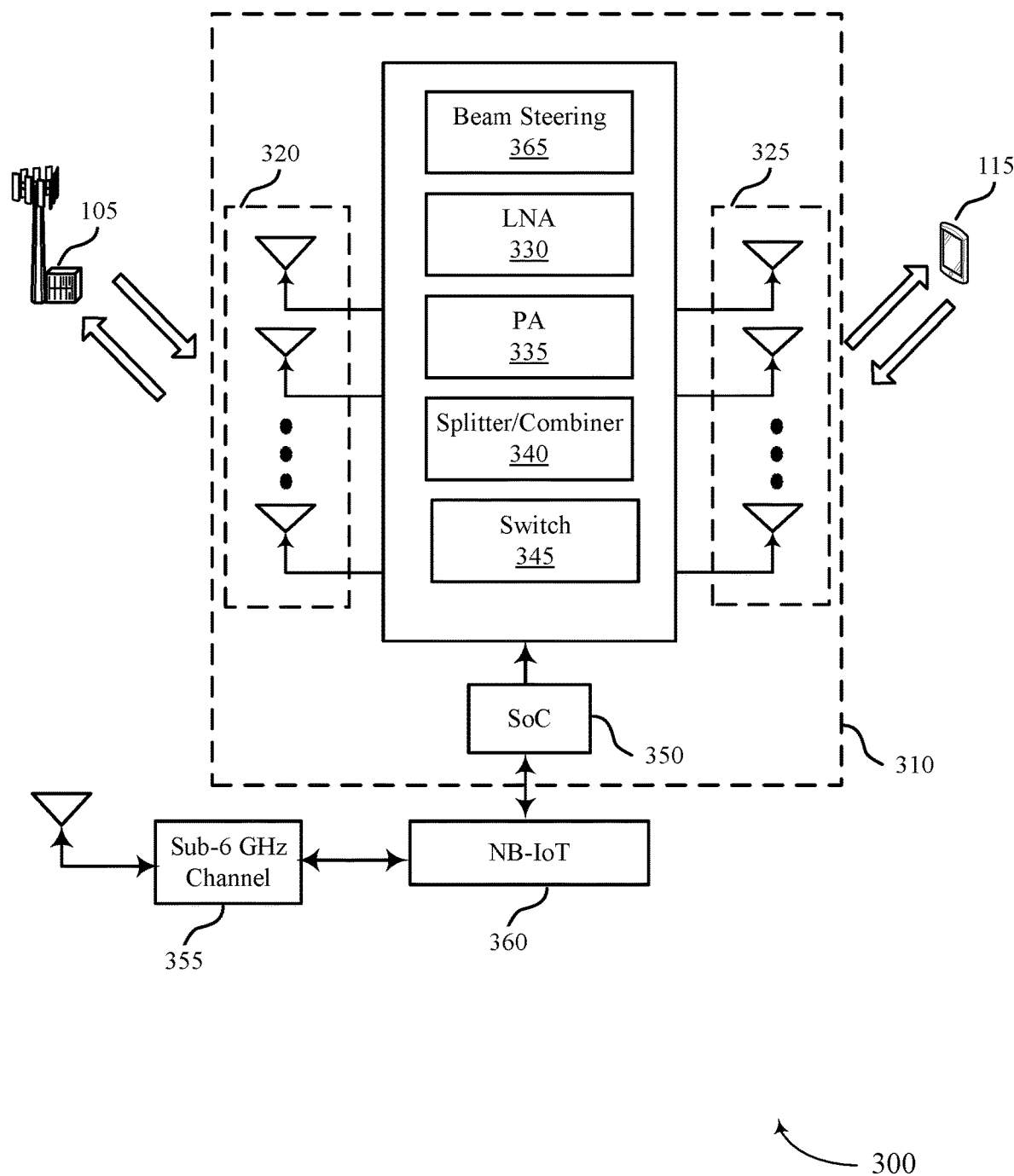
FIG. 3 illustrates an example of a block diagram that supports bidirectional repeaters for time division duplexed millimeter wave systems in accordance with aspects of the present disclosure.

FIG. 3 illustrates an example of a block diagram 300 of a bidirectional repeater 310 in accordance with aspects of the present disclosure. In some examples, the devices of FIG. 3 may implement aspects of wireless communications system 100. For example, FIG. 3 includes a base station 305 and a UE 315 which may be examples of the base station 105 and the UE 115 of FIG. 1. The bidirectional repeater 310 may include a first antenna array 320 including a first set of antennas and a second antenna array 325 including a second set of antennas. FIG. 3 may be illustrative of and support a wireless downlink and uplink configuration.

In FIG. 3, the bidirectional repeater 310 may include a first antenna array 320 and a second antenna array 325 for receiving and transmitting signals. In some examples, the transmit and receive paths of the first and second antenna arrays may both remain active at the same time. This may allow for an increased coverage area as compared to the coverage area provided by merely changing the beamforming scan angle. The increased coverage area or enhanced field of view for the antenna arrays may be a result of both beam forming or beam steering and also the antenna arrays simultaneously switching from uplink to downlink. In FIG. 3, the bidirectional repeater 310 may include beam controlling or beam forming capabilities for transmitting and receiving signals at the first antenna array 320 and the second antenna array 325. In some examples, phase shifters may implement the beam forming which will be discussed in further detail herein.

In FIG. 3, the bidirectional repeater 310 may receive a signal from the base station 105 via the first antenna array 320. The first antenna array 320 may include one or more antennas as depicted in FIG. 3 and may be referred to interchangeably as the first antenna array or the first set of antennas. Similarly, the second antenna array 325 may include one or more antennas as depicted in FIG. 3 and may be referred to interchangeably as the second antenna array or the second set of antennas. The received signals may be combined, phase shifted, amplified, and split at the bidirectional repeater 310 and then transmitted at the second antenna array 325. Although the received signals may be discussed as being combined, phase shifted, amplified, and split, the purpose and the order of these functions may vary as will be discussed in further detail herein.

As illustrated in FIG. 3, in addition to the first and second antenna arrays, the bidirectional repeater 310 may include a beam steering component 365, a low noise amplifier 330, a power amplifier 335, a splitter/combiner 340, and a switch 345. Although the bidirectional repeater 310 in FIG. 3 depicts each of these components, in some examples, the bidirectional repeater 310 may omit one or more of these elements which will be discussed in further detail herein. The bidirectional repeater 310 may also include a system on a chip (SoC) component 350. The SoC component 350 may perform the functions such as beam forming control, gain control, and switching the antenna arrays between transmit and receive modes. Additionally, the switch may be controlled remotely via a secondary sub-6 GHz channel 355 (e.g., Narrow Band-Internet of Things NB-IoT 360). Further, the SoC component 350 may employ Bluetooth or Wi-Fi or any other appropriate transmit/receive signals.

In some examples, bidirectional repeater 310 may include a switch which may toggle the first antenna array from transmit to receive and vice versa and may also toggle the second antenna array from transmit to receive and vice versa. In some examples, the switch may be a DPDT switch which may receive the timing from a gNodeB via a sub-6 GHz RF channel as discussed in detail herein. The gNodeB may provide the timing of the TDD guard period so that the DPDT switch may toggle the antenna arrays from transmit to receive or vice versa approximately at the same time as the TDD guard period. The DPDT switch is discussed in further detail herein. In some examples, one the base station may be a gNodeB.

In FIG. 3, the wireless communications system may use relatively high frequencies and may be time division duplexed (TDD). The switch 345 may toggle during a period of time (e.g., a TDD guard period) between downlink and uplink portions of a TDD channel, or vice versa. In some examples, the first and second antenna arrays of the bidirectional repeater 310 may be simultaneously receiving and transmitting. In some examples, the first and second antenna arrays may be switched from downlink to uplink or vice versa and after being switched from a first mode to the second mode may stay on or active.

Figure 4:
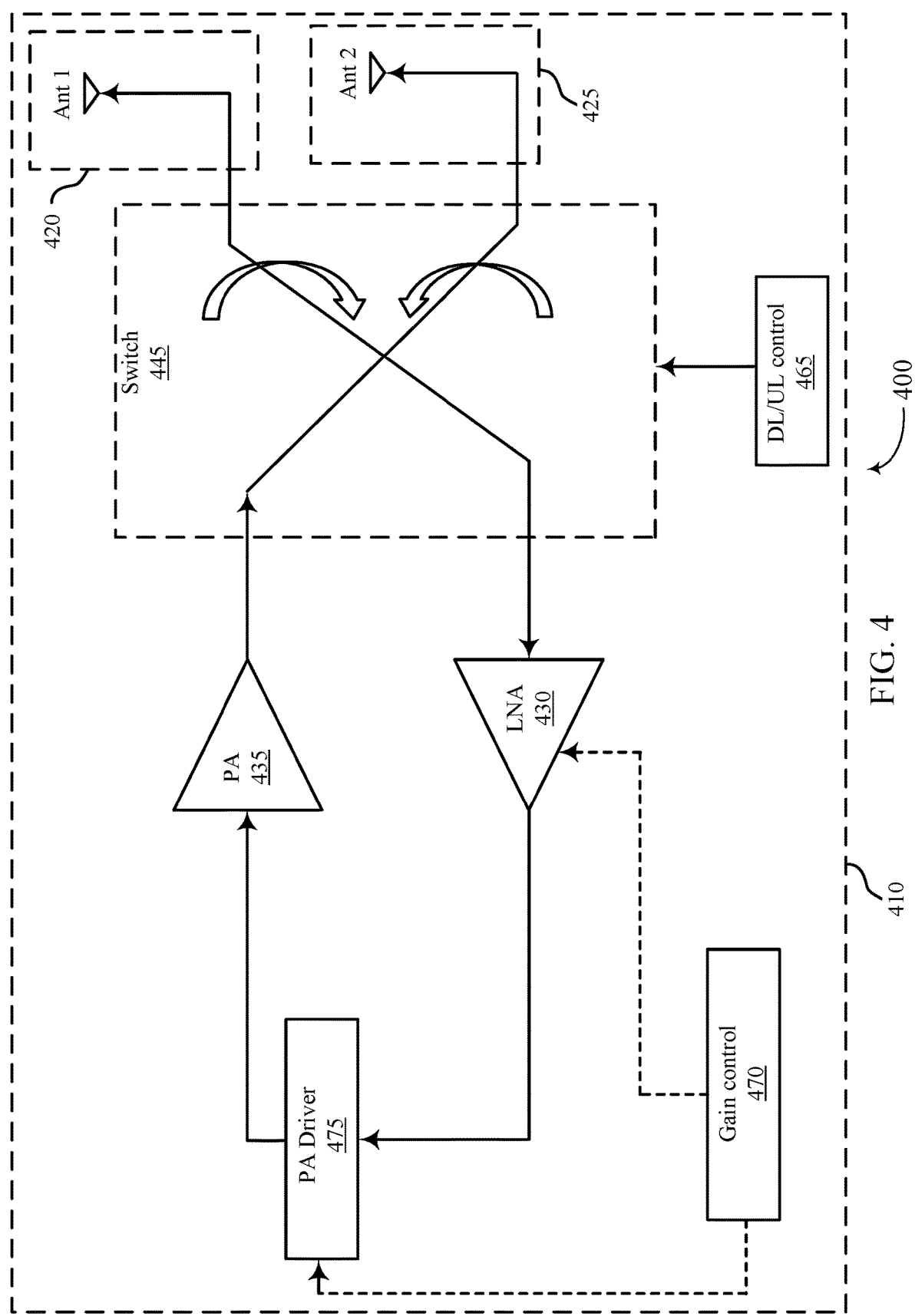
FIG. 4 illustrates an example of a block diagram that supports bidirectional repeaters for time division duplexed millimeter wave systems in accordance with aspects of the present disclosure.

In some examples of FIG. 3, the bidirectional repeater 310 may be capable of monitoring the signaling between the base station and the UE. By monitoring the signaling between the base station and the UE, the bidirectional repeater 310 may know when the downlink/uplink transitions occur and can adjust the timing of the switch accordingly FIG. 4 illustrates an example of a block diagram 400 of a bidirectional repeater 410 in accordance with aspects of the present disclosure. In some examples, the devices of FIG. 4 may implement aspects of wireless communications system 100. For example, FIG. 4 includes receiving and transmitting signals to and from a base station and a UE which may be examples of the base station 105 and the UE 115 of FIG. 1. FIG. 4 may be illustrative of a wireless downlink and uplink configuration and is provided for illustrative and explanatory purposes.

In FIG. 4, the bidirectional repeater 410 may include a first antenna array 420 with a first set of antennas and a second antenna array 425 with a second set of antennas. Both the first antenna array 420 and the second antenna array 425 may transmit or receive signals to and from a base station and a UE. The first and second antenna arrays may be coupled to the DPDT switch 445, which in some examples may be a di-pole di-throw switch (DPDT switch). The DPDT switch 445 may switch two devices at approximately the same time for transmitting and receiving and may be capable of switching in the approximate range of thousands of times per second. The DPDT switch 445 may be a metamaterial switch which may be engineered from man-made materials. Further, the DPDT switch 445 may have low insertion loss as the DPDT switch 445 may not degrade the performance of the bidirectional repeater 410 by not reducing the signal a noticeable amount. For the purposes of this disclosure, insertion loss in the range of 0.5 to 3 dB is considered low insertion loss.

As depicted in FIG. 4, the DPDT switch 445 may be coupled to the power amplifier 435 and the low noise amplifier 430. In some examples, the first antenna array 420 may be the output of the power amplifier 435. In some examples, the first antenna array 420 may be the output of the low noise amplifier 430. Similarly, the second antenna array 425 may be the output of either one of the power amplifier 435 or the low noise amplifier 430. The DPDT switch 445 may be controlled by the downlink/uplink control 465. In FIG. 4, the downlink/uplink control 465 and the gain control 470 may be included as part of the SoC component 350 of FIG. 3. The gain control 470 may be used to control the gain of the low noise amplifier 430 and the power amplifier driver 475 where the power amplifier driver 475 may drive the power amplifier 435. The low noise amplifier 430 and the power amplifier 435 may be used to amplify the input signals and/or the output signals which may be received and/or transmitted at the first antenna array 420 and/or the second antenna array 425.

As previously discussed in FIG. 3, the bidirectional repeater may include a first antenna array and a second antenna array for receiving and transmitting signals. In some examples, the transmit and receive paths of the first and second antenna arrays may both remain active at the same time. The bidirectional repeater may be configured to apply different phase shifts to the first and second antenna array to implement different beamforming configurations, thus increasing the coverage area and improving signal quality by providing more targeted beam directions.

In some examples, the bidirectional repeater 410 may also include one or more phase shifters (not illustrated in FIG. 4). The phase shifter(s) may implement beam forming or beam steering on either one or both of the first and second antenna arrays. The phase shifter may set the phase shift value and the antenna arrays may sweep or scan the angles according to the phase shift values provided by the phase shifter. In some examples, the phase shift value of the phase shifter may be based on the net angle between the transmit and receive angles of the antenna arrays. Additionally or alternatively, the phase shifter(s) may implement beamforming on the first and second antenna arrays and even though the first and second antenna arrays may be toggled between transmit and receive modes or vice versa, the beamforming configuration of the first and second antenna may remain substantially the same for both modes.

Figure 5:
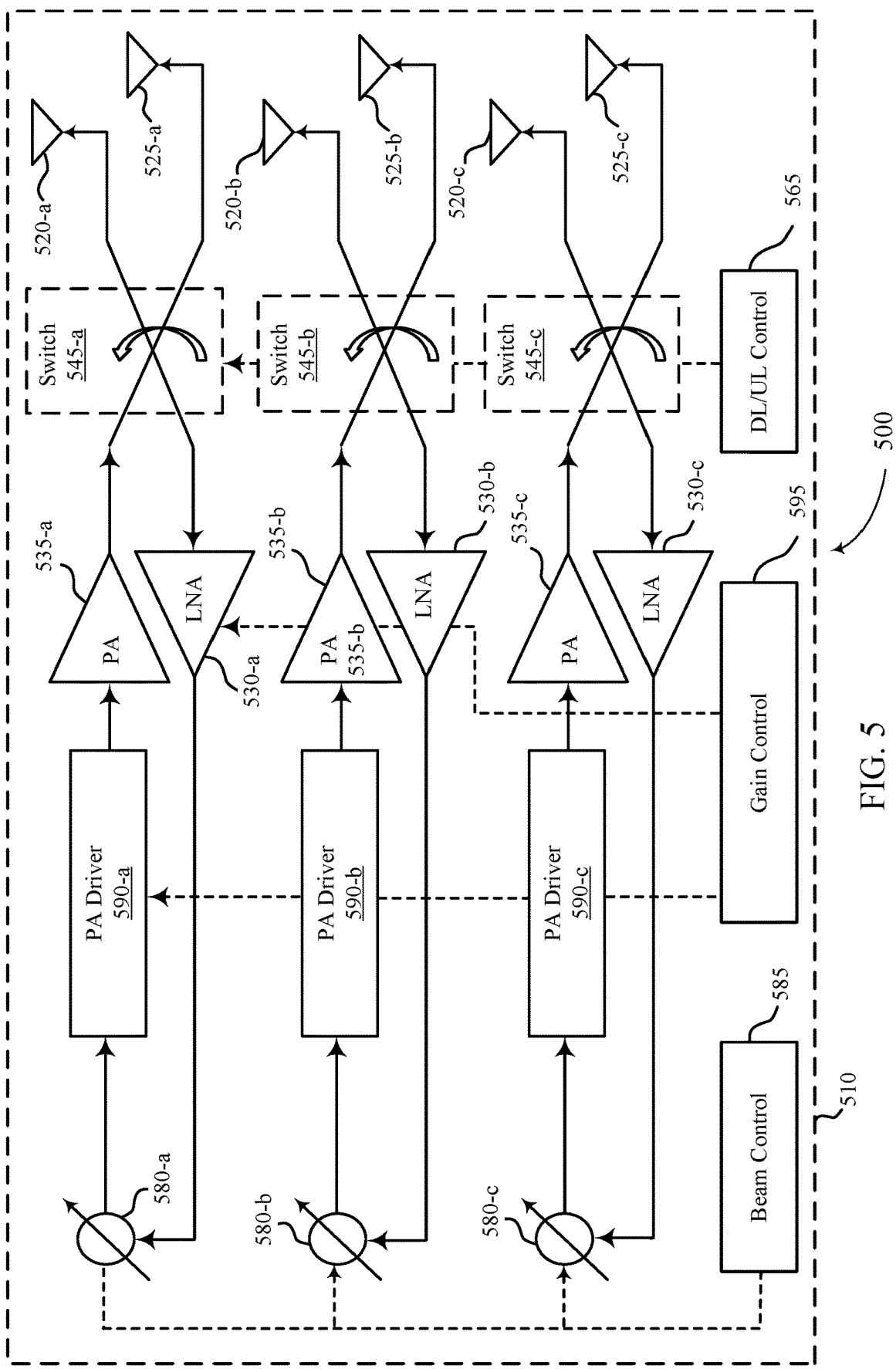
FIG. 5 illustrates an example of a block diagram that supports bidirectional repeaters for time division duplexed millimeter wave systems in accordance with aspects of the present disclosure.

FIG. 5 illustrates an example of a block diagram 500 of a bidirectional repeater 510 in accordance with aspects of the present disclosure. In some examples, the devices of FIG. 5 may implement aspects of wireless communications system 100. For example, FIG. 5 includes receiving and transmitting signals to and from a base station and a UE which may be examples of the base station 105 and the UE 115 of FIG. 1. The bidirectional repeater 510 of FIG. 5 may be illustrative of and support a wireless downlink and uplink configuration.

In FIG. 5 and similar to FIG. 4, the bidirectional repeater 510 may include a first antenna array 520 and a second antenna array 525 with a second set of antennas. The first and second antenna arrays may be coupled to the DPDT switch 545. As illustrated in FIG. 5, there may be one or more sets of the first antenna array 520 (e.g., first antenna array 520-a, first antenna array 520-b, first antenna array 520-c), one or more sets of second antenna array 525 (e.g., second antenna array 525-a, second antenna array 525-b, second antenna array 525-c), and one or more sets of DPDT switch 545 (e.g., DPDT switch 545-a, DPDT switch 545-b, DPDT switch 545-c).

The bidirectional repeater 510 may also include a power amplifier 535 which may be coupled to the DPDT switch 545 and to the power amplifier driver 590 and in some examples, there may be one or more sets of the power amplifier 535 (e.g., power amplifier 535-a, power amplifier 535-b, power amplifier 535-c) and one of more sets of the power amplifier driver 590 (e.g., power amplifier driver 590-a, power amplifier driver 590-b, and power amplifier driver 590-c). The power amplifier driver 590 and the power amplifier 535 may receive control information from the gain control element 595 or may provide information to the gain control element 595. The gain control element 595 may control the gain of the power amplifier 535 and may make adjustments to the power amplifier 535 via the power amplifier driver 590.

In FIG. 5, the bidirectional repeater 510 may include a low noise amplifier 530 which may be coupled with the DPDT switch 545 and the phase shifter 580. In some examples, there may be one or more low noise amplifiers 530 (e.g., low noise amplifier 530-a, low noise amplifier 530-b, and low noise amplifier 530-c). Although some of the sets of elements of FIG. 5 have been discussed as including three elements in each set, any appropriate number of elements may be included in the sets of elements.

The DPDT switch 545 may switch the first antenna array 520 from transmit to receive and vice versa and may also switch the second antenna array 525 from transmit to receive and vice versa. The downlink/uplink control 565 may provide the DPDT switch 545 with the switch timing for the antenna arrays. As shown in FIG. 5 and in some examples, the bidirectional repeater 510 may include one DPDT switch 545 per pair of antennas. That is, there may be one DPDT switch 545 per each set of first and second antenna arrays. In some examples, the DPDT switch 545 may receive the switch timing from a base station via a sub-6 GHz RF channel as depicted in FIG. 3. The base station may provide the downlink/uplink control 565 with the timing of the TDD guard period so that the downlink/uplink control 565 may provide the DPDT switch 545 with the appropriate time to switch the antenna arrays from transmit to receive or vice versa. In some examples, one example of the base station may be a gNodeB.

In some examples, the DPDT switch 545 may toggle the first antenna array from a transmit mode to a receive mode and there may be a time duration or switching latency associated with toggling the first antenna array between modes. Because the DPDT switch 545 is toggling between the transmit and receive configurations during the TDD guard period, the latency associated with the toggling may be shorter than or less than the TDD guard period duration.

The bidirectional repeater 510 may also include a phase shifter 580 which may be coupled to the power amplifier driver 590 and to the low noise amplifier 530. Similar to the other elements of FIG. 5, there may be one or more phase shifters 580 (e.g., phase shifter 580-a, phase shifter 580-b, and phase shifter 580-c). The phase shifter 580 may receive one or more signals from either one of the first or second antenna arrays and may implement beam forming or beam steering. In FIG. 5, the phase shift values of the phase shifter 580 may be set by the beam control 585. The phase shifter 580 may set the phase shift value and the antenna arrays may sweep or scan the angles according to the phase shift values provided by the phase shifter 580 and may scan or sweep the angles after receiving these phase shift values. In FIG. 5, the phase shift value of the phase shifter 580 may be based on the net angle between the transmit and receive angles of the antenna arrays. In some examples, the antenna array may "virtually" scan the space surrounding the antenna according to the phase shifter 580 without moving the antennas and according to the programmed phase shifters and in some examples, after the phase shifters provide the beamforming values. The terms phase shifting, electronic scanning, beam steering, beam forming, and electronic beam forming may be used interchangeably.

In some examples, the first antenna array may implement a first beamforming configuration to transmit and receive information to and from the base station and the second antenna array may implement a second beamforming configuration to transmit and receive information to and from the UE. By implementing the first beamforming configuration, the first antenna array may be directed or pointed at the base station and by implementing the second beamforming configuration, the second antenna array may be directed or pointed at the UE. Because the DPDT switch 545 may toggle the first and second antenna arrays between transmit and receive modes, the beamforming may not need to be reconfigured each time the signal switches from downlink to uplink.

In some examples of FIG. 5, a modem may be utilized for monitoring signal traffic and control signals. In this example, the bidirectional repeater 510 may be able to determine which of the signals may be uplink or downlink, thus providing greater control at the bidirectional repeater 510. In other examples of FIG. 5, the bidirectional repeater 510 may receive signaling from the gNodeB which may provide the bidirectional repeater 510 with information such as when to switch the antenna arrays, beamforming parameters for the antenna arrays, whether to scan to find one or more UEs, and so forth, or any combination thereof. In some examples, the base station may be a gNodeB.

Figure 6:
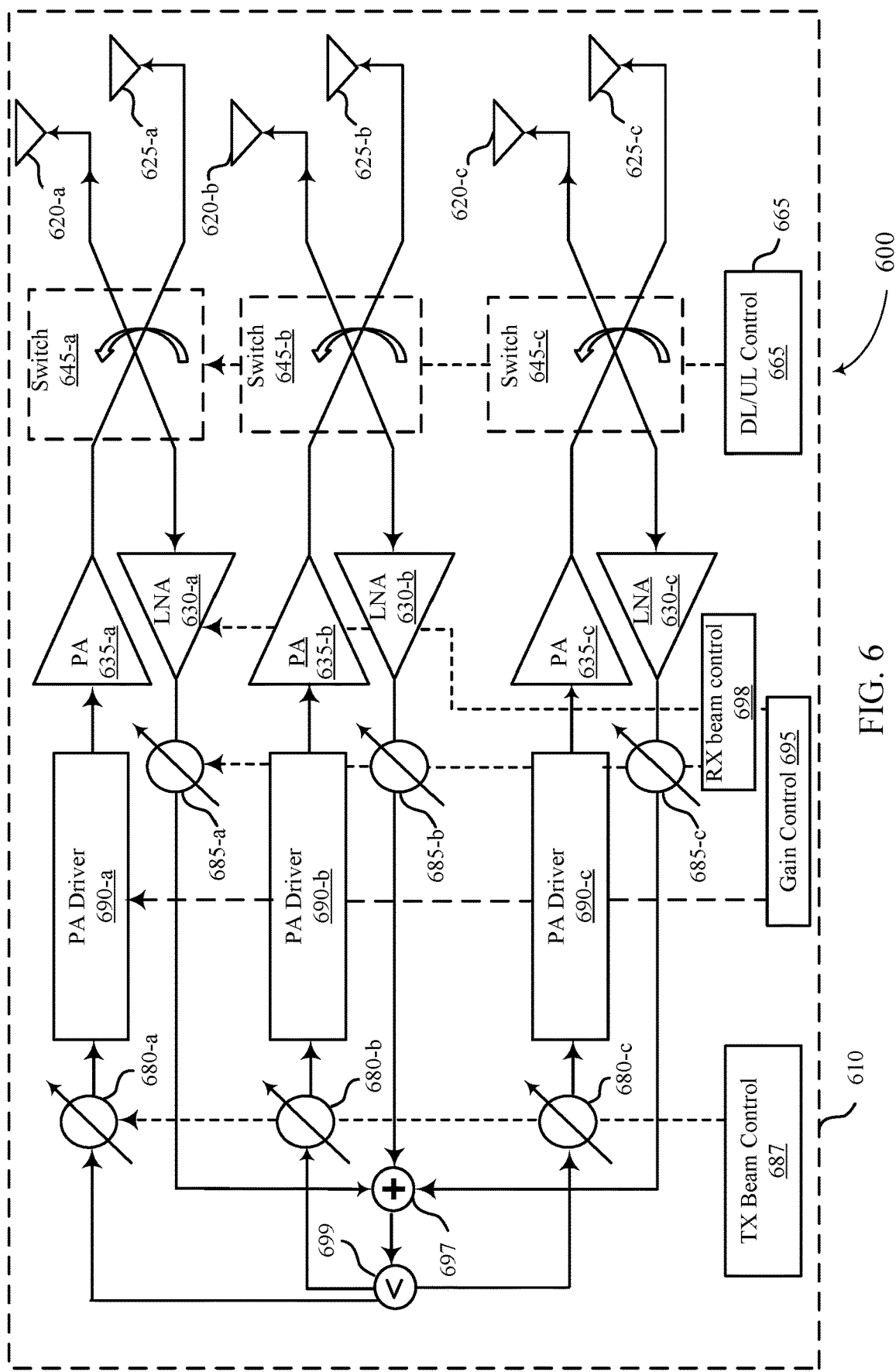
FIG. 6 illustrates an example of a block diagram that supports bidirectional repeaters for time division duplexed millimeter wave systems in accordance with aspects of the present disclosure.

FIG. 6 illustrates an example of a block diagram 600 of a bidirectional repeater 610 in accordance with aspects of the present disclosure. In some examples, the devices of FIG. 6 may implement aspects of wireless communications system 100. For example, FIG. 6 includes receiving and transmitting signals to and from a base station and a UE which may be examples of the base station 105 and the UE 115 of FIG. 1. FIG. 6 may include similar elements to at least FIG. 5 and corresponding elements may be similarly numbered. For example, first antenna array 520 of FIG. 5 may be similar to or the same as first antenna array 620 of FIG. 6 and DPDT switch 545 of FIG. 5 may be similar to or the same as DPDT switch 645 of FIG. 6. The bidirectional repeater 610 of FIG. 6 may be illustrative of and support a wireless downlink and uplink configuration.

Similar to FIG. 5, a switch, such as the DPDT switch 645 of FIG. 6 may be coupled to each of a first antenna array 620 and a second antenna array 625. The DPDT switch 645 may be further coupled to a power amplifier 635 and a low noise amplifier 630. Each of the DPDT switches 645 may receive switching information from the downlink/uplink control 665. The downlink/uplink control 665 may provide the DPDT switch 645 with the timing of the TDD guard period. The TDD guard period may allow an appropriate duration of time such that the DPDT switch 645 may switch the antenna arrays from transmit to receive or vice versa. The TDD guard period may be between the first TDD period and the second TDD period.

In some examples and as illustrated in FIG. 6, the bidirectional repeater 610 may include a first phase shifter 685, a second phase shifter 680. As illustrated in FIG. 6, the bidirectional repeater 610 may include a set of phase shifters 685 (e.g., phase shifter 685-*a*, phase shifter 685-*b*, and phase shifter 685-*c*). The second phase shifter 680 of FIG. 6 may also be a set of second phase shifters (e.g., phase shifter 680-*a*, phase shifter 680-*b*, and phase shifter 680-*c*). The first phase shifter 685 may be coupled with the power amplifier driver 690 and also may be coupled to the transmit beam control 687. The first phase shifter 685 may receive one or more signals from either one of the first or second antenna arrays and may implement beam forming or beam steering. As illustrated in FIG. 6, the first set of phase shifters 685 may be coupled to the RX beam control 698. In some examples, the first and second phase shifters may control the beam width and direction in the antenna arrays and in some examples, the first and second phase shifters may be controlled by one or more beam controllers (e.g., beamformers).

The transmission phase shift values for the first phase shifter 685 may be set by the transmit beam control 687. The transmit beam control 687 may provide the phase shift value for either one or both of the first and second antenna array when the antenna array is in the transmit mode. The first phase shifter 685 may set the phase shift value and the antenna arrays may sweep or scan the transmission angles according to the phase shift values provided by the first phase shifter 685.

In some examples, the second phase shifter 680 may be coupled to the low noise amplifier 630 and also coupled to the combiner 697. The combiner 697 may receive one or more input signals which may correspond to the first antenna array and may combine the input signals into a first waveform. The first waveform may be provided to the divider 699 and may be divided into one or more output signals. In some examples of FIG. 6, the combiner 697 and divider 699 may be combined into a single element which may perform both the combining and the dividing operations. The combining of the input signals in FIG. 6 may occur after routing the input signals through the DPDT switch 645 and also after applying the first set of phase shifts at 685 to the input signals. After the divider 699, the one or more output signals may be provided to the second phase shifter 680. In some examples, the combiner 697 may be a Wilkinson combiner and the divider 699 may be a Wilkinson divider.

Figure 7:
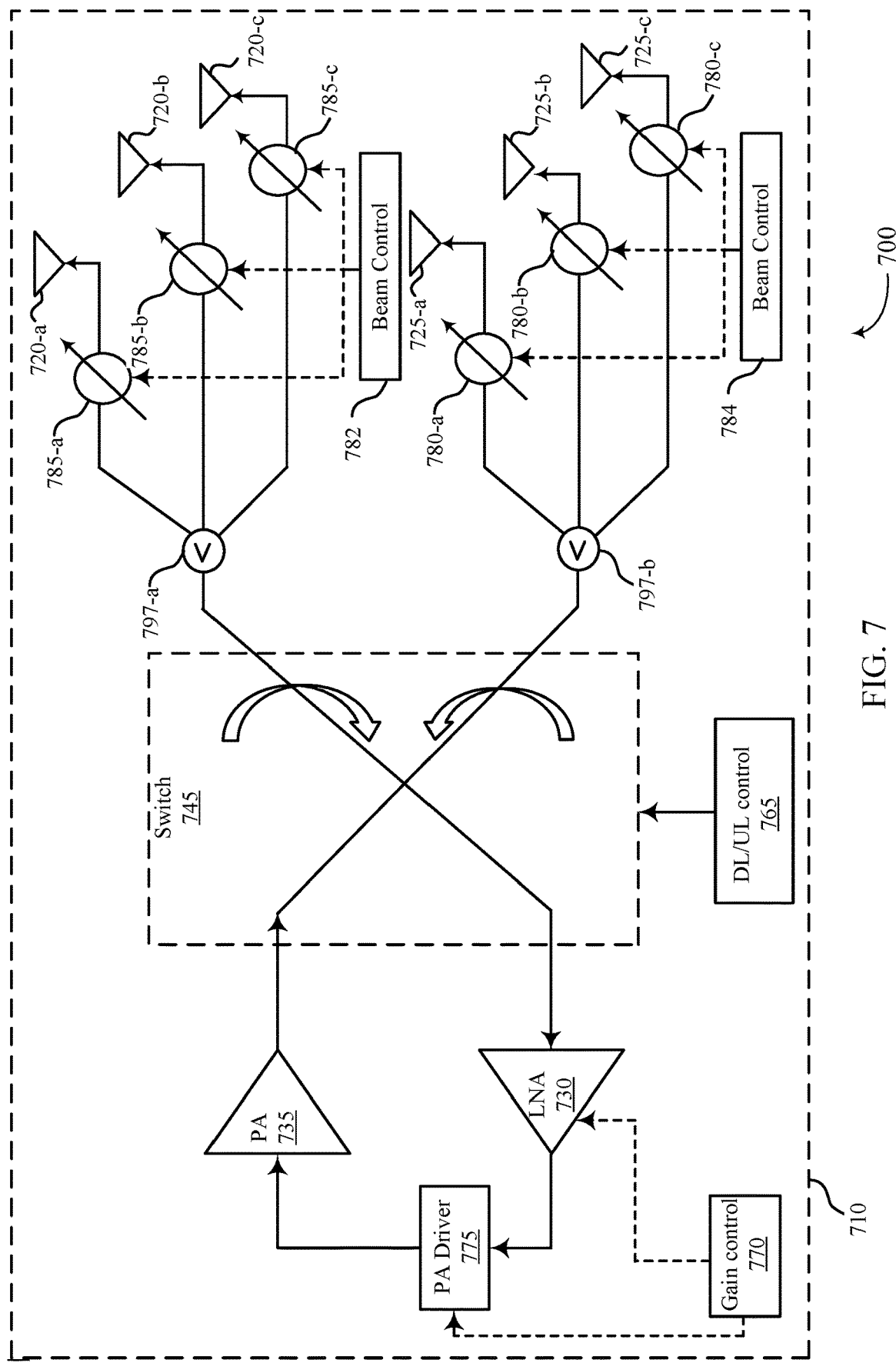
FIG. 7 illustrates an example of a block diagram that supports bidirectional repeaters for time division duplexed millimeter wave systems in accordance with aspects of the present disclosure.

FIG. 7 illustrates an example of a block diagram 700 that supports bidirectional repeaters for time division duplexed millimeter wave systems in accordance with aspects of the present disclosure. In some examples, the devices of FIG. 7 may implement aspects of wireless communications system 100. For example, FIG. 7 includes receiving and transmitting signals to and from a base station and a UE which may be examples of the base station 105 and the UE 115 of FIG. 1. FIG. 7 may include similar elements to at least FIGS. 5 and 6 and corresponding elements may be similarly numbered. For example, first antenna array 520 of FIG. 5 and 620 of FIG. 6 may be similar to or the same as first antenna array 720 of FIG. 7 and DPDT switch 545 of FIG. 5 and DPDT switch 645 of FIG. 6 may be similar to or the same as DPDT switch 745 of FIG. 7. The bidirectional repeater 710 of FIG. 7 may be illustrative of and support a wireless downlink and uplink configuration.

In FIG. 7, the one or more signals received at the first antenna array 720 may be provided to the phase shifter 785. The phase shifter 785 may be a first set of phase shifters (e.g., phase shifter 785-*a*, phase shifter 785-*b*, phase shifter 785-*c*), where each of the individual antennas of the first antenna array 720 may correspond to an individual phase shifter of the first set of phase shifters 785. After passing through the first set of phase shifters 785, the one or more input signals may be provided to the combiner/divider 797 to provide a first waveform to the DPDT switch 745. In some examples of FIG. 7, the combiner and divider may be combined into a single element which may perform both the combining and the dividing operations. Additionally, in FIG. 7, the first set of phase shifters 785 may be coupled to the beam control 782 and the second set of phase shifters 780 may be coupled to the beam control 784. The beam control may provide beamforming configuration information to the first and second phase shifters so that the phase shifters may implement the appropriate beamforming configuration to the one or more received and transmitted signals.

In some examples, the DPDT switch 745 may switch both the first antenna array 720 and the second antenna array 725. The DPDT switch 745 may be further coupled to a power amplifier 735 and a low noise amplifier 730. The DPDT switch 745 may receive switching information from the downlink/uplink control 765. The downlink/uplink control 765 may provide the DPDT switch 745 with the timing of the TDD guard period. The TDD guard period may allow an appropriate duration of time such that the DPDT switch 745 may switch the antenna arrays from transmit to receive or vice versa. The TDD guard period may be between the first TDD period and the second TDD period.

Similar to FIGS. 5 and 6, the low noise amplifier 730 and the power amplifier may amplify the first waveform. The power amplifier driver 775 and the low noise amplifier 730 may both be coupled to the gain control 770. The power amplifier 735 may provide the amplified first waveform to the DPDT switch 745 which may be divided at the combiner/divider 797 into one or more output signals. The one or more output signals may be provided to the second set of phase shifters 780 and may be transmitted via the second antenna array 725.

Figure 8:
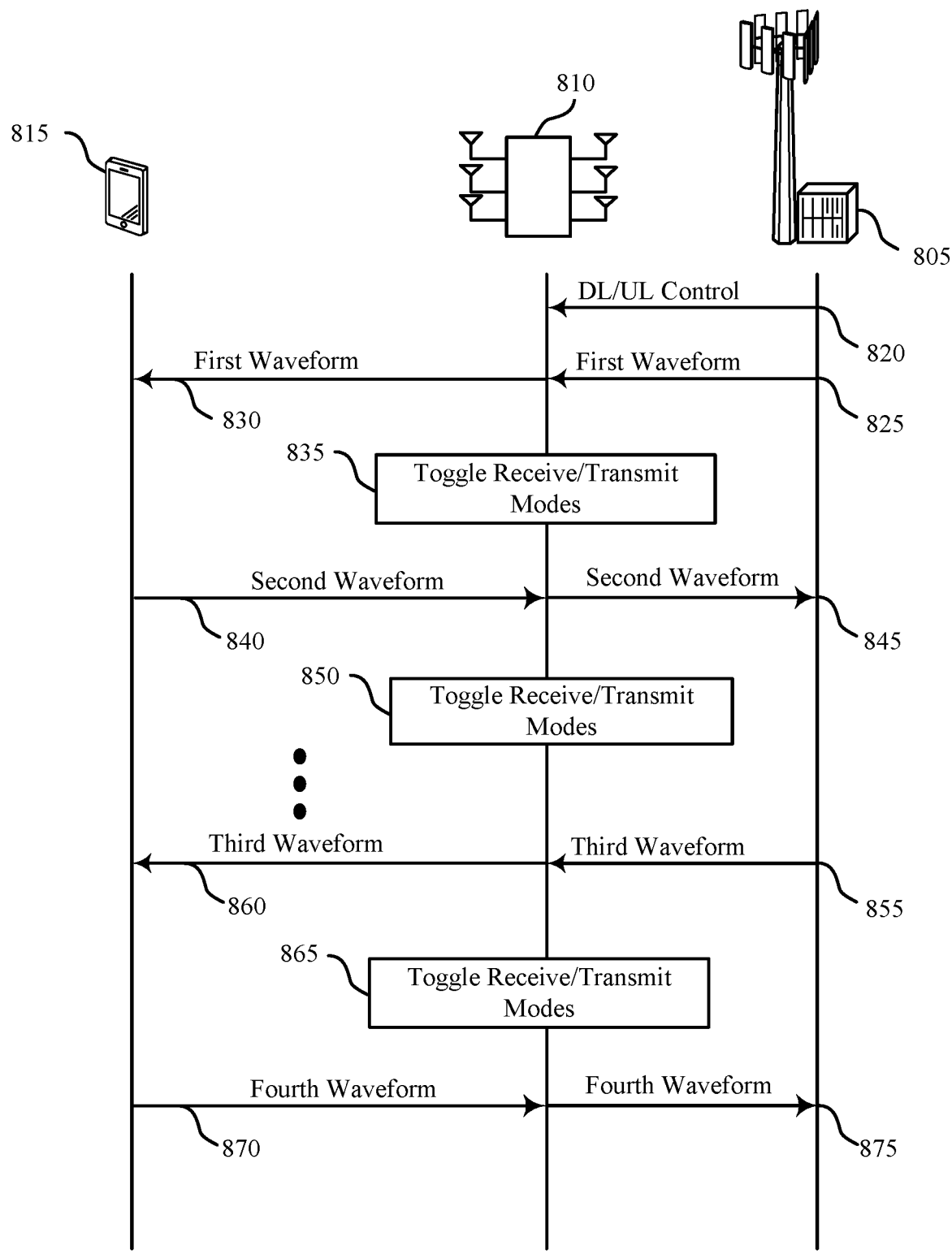
FIG. 8 illustrates an example of a process flow that supports bidirectional repeaters for time division duplexed millimeter wave systems in accordance with aspects of the present disclosure.

FIG. 8 illustrates an example of a process flow 800 that supports bidirectional repeaters for time division duplexed millimeter wave systems in accordance with aspects of the present disclosure. In some examples, process flow 800 may implement aspects of wireless communications system 100. In some examples, the process flow 800 of FIG. 8 may implement aspects of the wireless communications system 100 of FIG. 1. The process flow 800 may include a base station 805 and a UE 815 which may be examples of the base station 105 and the UE 115 of FIG. 1. The process flow 800 of FIG. 8 may be illustrative of and support a wireless downlink and uplink configuration.

At 820, the DPDT switch of the bidirectional wireless repeater 810 may receive downlink/uplink control information which may synchronize the switching of the antenna arrays by the DPDT switch with the TDD guard period downlink/uplink switching of the base station 805. The TDD guard period may be a time duration between the first time domain duplexing period and the second time domain duplexing period. The DPDT switch may be coupled to the first antenna array and the second antenna array of the bidirectional wireless repeater 810.

At 825, the first antenna array of the bidirectional wireless repeater 810 may receive a first waveform during a first time domain duplexing period. During the first time domain duplexing period and at 830, the first waveform may be transmitted by the second antenna array of the bidirectional wireless repeater 810. In some examples, the first antenna array may utilize a first beamforming configuration and the second antenna array may utilize a second beamforming configuration.

At 835, The bidirectional wireless repeater 810 may toggle the receive and transmit modes of the antenna arrays at 835 according to the downlink/uplink control information. In some examples, the base station 805 may be a gNodeB.

At 840, the second antenna array may receive a second waveform during the second time domain duplexing period, and at 845, the second waveform may be transmitted by the first antenna array of the bidirectional wireless repeater 810. The bidirectional wireless repeater 810 may repeat this series of operations as illustrated in FIG. 8.

At 850, the bidirectional wireless repeater 810 may toggle the receive and transmit modes of the antenna arrays according to the downlink/uplink control information as previously discussed.

At 855, the first antenna array of the bidirectional wireless repeater 810 may receive a third waveform during a first time domain duplexing period. During the first time domain duplexing period and at 860, the third waveform may be transmitted by the second antenna array of the bidirectional wireless repeater 810. In some examples, the first antenna array may utilize a third beamforming configuration and the fourth antenna array may utilize a fourth beamforming configuration.

The bidirectional wireless repeater 810 may toggle the receive and transmit modes of the antenna arrays at 865 according to the downlink/uplink control information. The time during which the bidirectional wireless repeater 810 may toggle the receive and transmit modes of the antenna arrays may be based on the downlink/uplink control information received at 820.

At 870, the second antenna array may receive a fourth waveform during the fourth time domain duplexing period, and at 875, the fourth waveform may be transmitted by the first antenna array of the bidirectional wireless repeater 810 and so forth.

Figure 9:
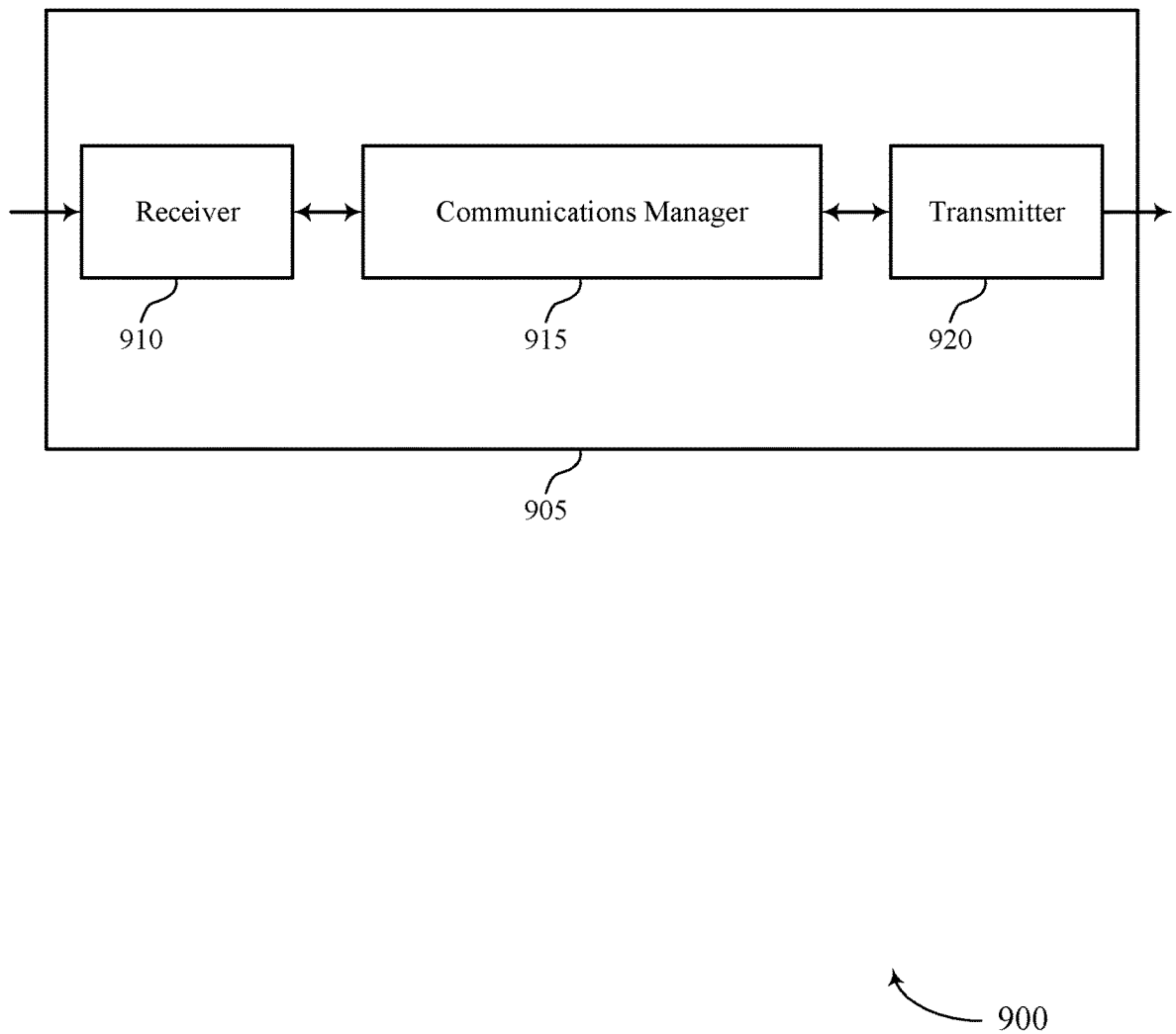
FIGS. 9 and 10 show block diagrams of devices that support bidirectional repeaters for time division duplexed millimeter wave systems in accordance with aspects of the present disclosure.

FIG. 9 shows a block diagram 900 of a device 905 that supports bidirectional repeaters for time division duplexed millimeter wave systems in accordance with aspects of the present disclosure. The device 905 may be an example of aspects of a device as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to bidirectional phased-array repeaters for TDD mmW systems, etc.). Information may be passed on to other components of the device 905. The receiver 910 may be an example of aspects of the transceiver 1220 described with reference to FIG. 12. The receiver 910 may utilize a single antenna or a set of antennas.

The receiver 910 may receive, at a first antenna array of the wireless repeater, a first waveform during a first time domain duplexing period, and the transmitter 920 may transmit, at the first antenna array, a second waveform received at the second antenna array of the wireless repeater during the second time domain duplexing period. The transmitter 920 may also transmit, at a second antenna array of the wireless repeater, the first waveform during the first time domain duplexing period, where the first antenna array includes a first beamforming configuration and the second antenna array includes a second beamforming configuration. The communications manager 915, may then control a di-pole di-throw (DPDT) switch coupled to the first antenna array and the second antenna array during a guard period between the first time domain duplexing period and a second time domain duplexing period, where controlling the DPDT switch toggles the first antenna array from a transmit configuration to a receive configuration and the second antenna array from the receive configuration to the transmit configuration. The communications manager 915 may be an example of aspects of the communications manager 1210 described herein. The actions performed by the receiver 910, the transmitter 920 and the communications manager 915 may be implemented to realize one or more potential advantages. One implementation may allow the UE 115 to reduce complexity for implementing beamforming. The beamforming complexity may be reduced since the antenna arrays may not need to be reconfigured as frequently for TDD communication.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, the communications manager 915 may be implemented by a wireless modem chip or chipset, and may be coupled with the receiver 910 over a first interface and coupled with the transmitter 920 over a second interface. One implementation may be receiving, at a first antenna array of the wireless repeater, a first waveform during a first time domain duplexing period, transmitting, at the first antenna array, a second waveform received at the second antenna array of the wireless repeater during the second time domain duplexing period, transmitting, at a second antenna array of the wireless repeater, the first waveform during the first time domain duplexing period, where the first antenna array includes a first beamforming configuration and the second antenna array includes a second beamforming configuration. The implementation may also include controlling a di-pole di-throw (DPDT) switch coupled to the first antenna array and the second antenna array during a guard period between the first time domain duplexing period and a second time domain duplexing period, where controlling the DPDT switch toggles the first antenna array from a transmit configuration to a receive configuration and the second antenna array from the receive configuration to the transmit configuration. This implementation may support lower latency downlink to uplink (or vice versa) transitions due to the use of a switch as opposed to reconfiguring phase shifts for each downlink to uplink transition.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
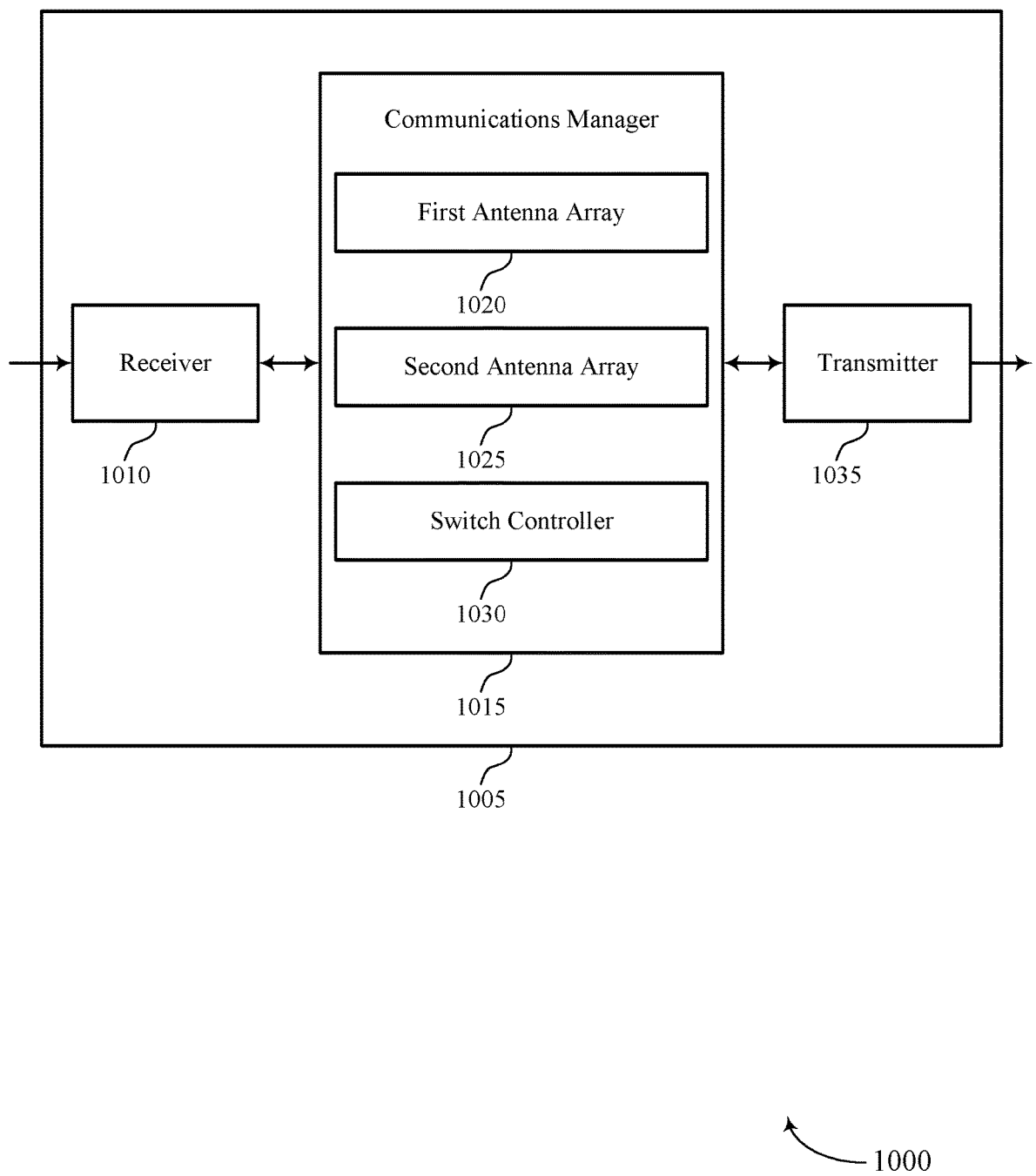

FIG. 10 shows a block diagram 1000 of a device 1005 that supports bidirectional repeaters for time division duplexed millimeter wave systems in accordance with aspects of the present disclosure. The device 1005 may be an example of aspects of a device 905 or a bidirectional repeater 140 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to bidirectional phased-array repeaters for TDD mmW systems, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a first antenna array 1020, a second antenna array 1025, and a switch controller 1030. The communications manager 1015 may be an example of aspects of the communications manager 1210 described herein.

The first antenna array 1020 may receive, at a first antenna array of the wireless repeater, a first waveform during a first time domain duplexing period and transmit, at the first antenna array, a second waveform received at the second antenna array of the wireless repeater during the second time domain duplexing period.

The second antenna array 1025 may transmit, at a second antenna array of the wireless repeater, the first waveform during the first time domain duplexing period, where the first antenna array includes a first beamforming configuration and the second antenna array includes a second beamforming configuration.

The switch controller 1030 may control a di-pole di-throw (DPDT) switch coupled to the first antenna array and the second antenna array during a guard period between the first time domain duplexing period and a second time domain duplexing period, where controlling the DPDT switch toggles the first antenna array from a transmit configuration to a receive configuration and the second antenna array from the receive configuration to the transmit configuration.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
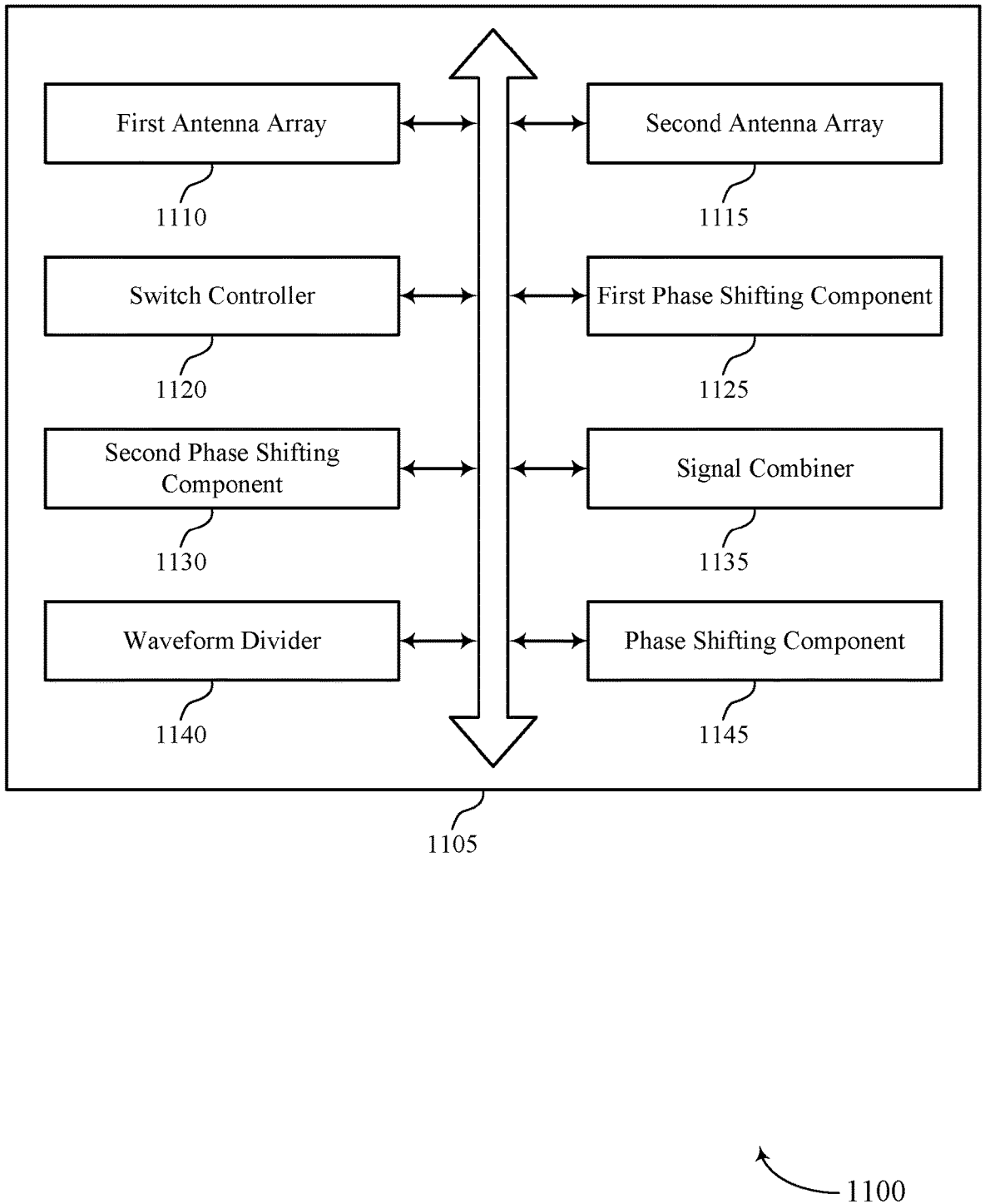
FIG. 11 shows a block diagram of a communications manager that supports bidirectional repeaters for time division duplexed millimeter wave systems in accordance with aspects of the present disclosure.

FIG. 11 shows a block diagram 1100 of a communications manager 1105 that supports bidirectional repeaters for time division duplexed millimeter wave systems in accordance with aspects of the present disclosure. The communications manager 1105 may be an example of aspects of a communications manager 915, a communications manager 1015, or a communications manager 1210 described herein. The communications manager 1105 may include a first antenna array 1110, a second antenna array 1115, a switch controller 1120, a first phase shifting component 1125, a second phase shifting component 1130, a signal combiner 1135, a waveform divider 1140, and a phase shifting component 1145. Each of these modules may communicate, directly or indirectly, with one another (e.g., via one or more buses).

The first antenna array 1110 may receive, at a first antenna array of the wireless repeater, a first waveform during a first time domain duplexing period.

In some examples, the first antenna array 1110 may transmit, at the first antenna array, a second waveform received at the second antenna array of the wireless repeater during the second time domain duplexing period.

The second antenna array 1115 may transmit, at a second antenna array of the wireless repeater, the first waveform during the first time domain duplexing period, where the first antenna array includes a first beamforming configuration and the second antenna array includes a second beamforming configuration.

The switch controller 1120 may control a di-pole di-throw (DPDT) switch coupled to the first antenna array and the second antenna array during a guard period between the first time domain duplexing period and a second time domain duplexing period, where controlling the DPDT switch toggles the first antenna array from a transmit configuration to a receive configuration and the second antenna array from the receive configuration to the transmit configuration.

In some examples, the switch controller 1120 may control a set of DPDT switches, where each DPDT switch is disposed between a first corresponding antenna of the first antenna array and a second corresponding antenna of the second antenna array.

In some examples, the switch controller 1120 may control a set of DPDT switches, where each DPDT switch is disposed between a first corresponding antenna of the first antenna array and a second corresponding antenna of the second antenna array, and where applying the set of phase shifts occurs between a first node of each DPDT switch and a second node of each DPDT switch.

The first phase shifting component 1125 may apply a first set of phase shifts to implement the first beamforming configuration. In some examples, the first phase shifting component 1125 may apply the first set of phase shifts to a set of input signals corresponding to the second antenna array.

The second phase shifting component 1130 may apply a second set of phase shifts to implement the second beamforming configuration. In some examples, the second phase shifting component 1130 may apply the second set of phase shifts to the set of output signals.

The signal combiner 1135 may combine a set of input signals corresponding to the first antenna array, where the combining occurs after routing the set of inputs through the set of DPDT switches and applying the first set of phase shifts to the set of input signals. In some examples, the signal combiner 1135 may combine the set of input signals, where the combining occurs between the second antenna array and the DPDT switch.

The waveform divider 1140 may divide the first waveform into a set of output signals corresponding to the second antenna array, where the dividing occurs between the DPDT switch and the second antenna array.

The phase shifting component 1145 may apply a set of phase shifts to the first waveform and the second waveform, where the set of phase shifts is applied between the first antenna array and the second antenna array, and where the set of phase shifts is based on a net angle difference between the first beamforming configuration and the second beamforming configuration.

Figure 12:
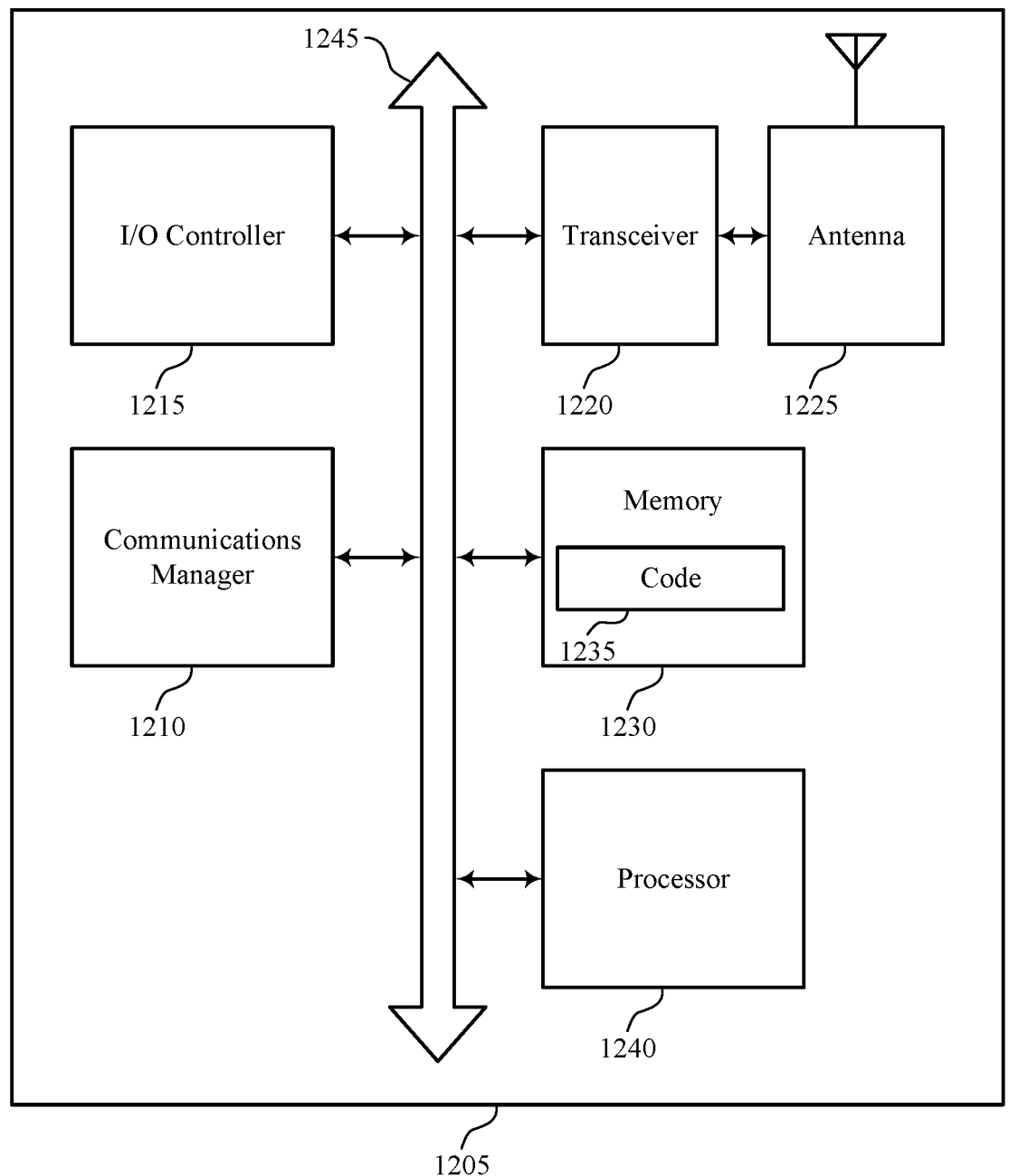
FIG. 12 shows a diagram of a system including a device that supports bidirectional repeaters for time division duplexed millimeter wave systems in accordance with aspects of the present disclosure.

FIG. 12 shows a diagram of a system 1200 including a device 1205 that supports bidirectional repeaters for time division duplexed millimeter wave systems in accordance with aspects of the present disclosure. The device 1205 may be an example of or include the components of device 905, device 1005, or a device as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive, at a first antenna array of the wireless repeater, a first waveform during a first time domain duplexing period, transmit, at the first antenna array, a second waveform received at the second antenna array of the wireless repeater during the second time domain duplexing period, transmit, at a second antenna array of the wireless repeater, the first waveform during the first time domain duplexing period, where the first antenna array includes a first beamforming configuration and the second antenna array includes a second beamforming configuration, and control a di-pole di-throw (DPDT) switch coupled to the first antenna array and the second antenna array during a guard period between the first time domain duplexing period and a second time domain duplexing period, where controlling the DPDT switch toggles the first antenna array from a transmit configuration to a receive configuration and the second antenna array from the receive configuration to the transmit configuration. The actions performed by the communications manager 1210 as described herein may be implemented to realize one or more potential advantages. One implementation may allow the device to lower power consumption of the device due to a reduction in reconfiguring beamforming configurations. Another implementation may allow the device to improve signal throughput due to lower latency switching between downlink to uplink configurations. This may result in an improved or better user experience due to reduced processing latency.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting bidirectional phased-array repeaters for TDD mmW systems).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
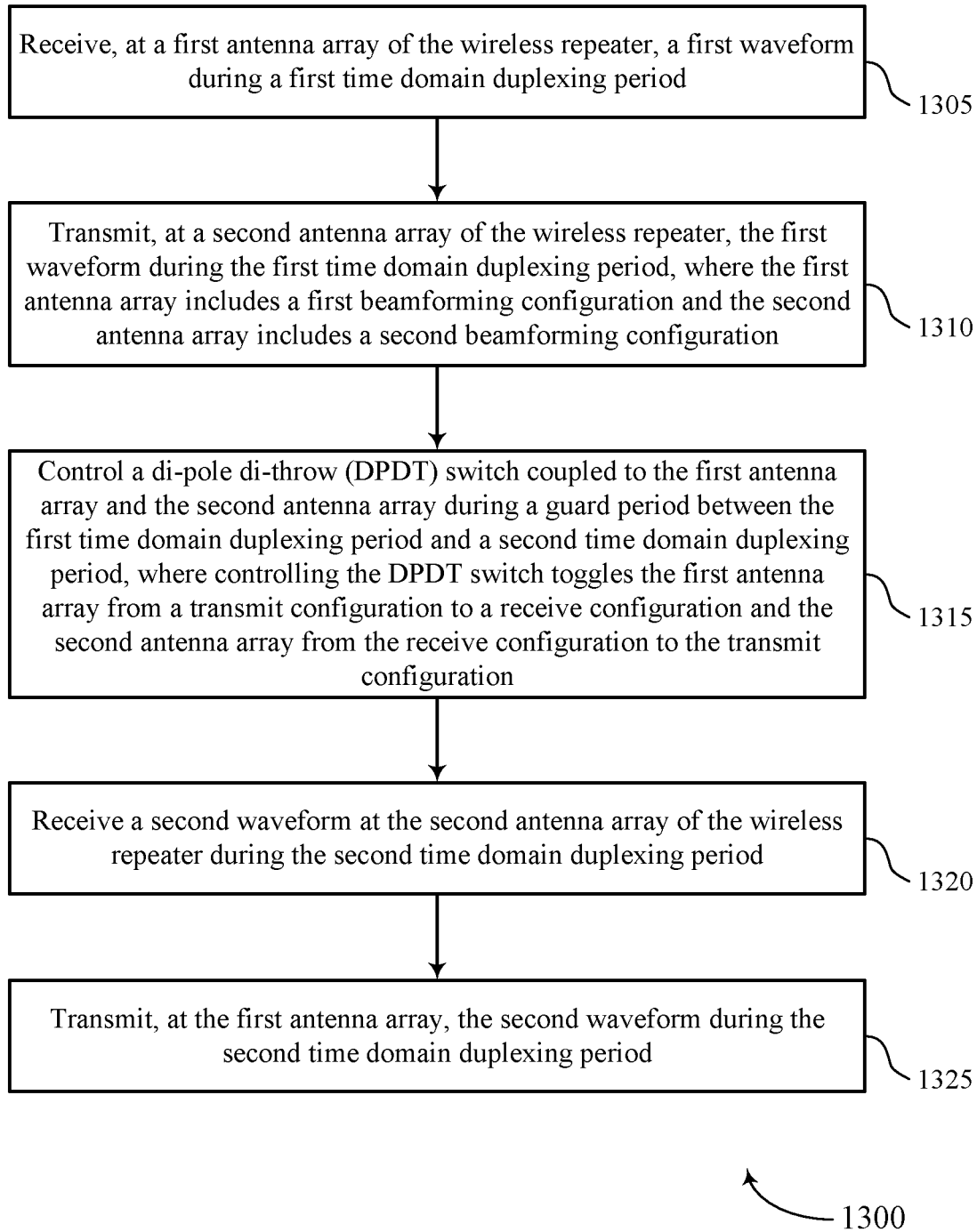
FIGS. 13 through 16 show flowcharts illustrating methods that support bidirectional repeaters for time division duplexed millimeter wave systems in accordance with aspects of the present disclosure.

FIG. 13 shows a flowchart illustrating a method 1300 that supports bidirectional repeaters for time division duplexed millimeter wave systems in accordance with aspects of the present disclosure. The operations of method 1300 may be implemented by a device or its components as described herein. For example, the operations of method 1300 may be performed by a communications manager as described with reference to FIGS. 9 through 12. In some examples, a device may execute a set of instructions to control the functional elements of the device to perform the functions described herein. Additionally or alternatively, a device may perform aspects of the functions described herein using special-purpose hardware.

At 1305, the device may receive, at a first antenna array of the wireless repeater, a first waveform during a first time domain duplexing period. The operations of 1305 may be performed according to the methods described herein. In some examples, aspects of the operations of 1305 may be performed by a first antenna array as described with reference to FIGS. 9 through 12.

At 1310, the device may transmit, at a second antenna array of the wireless repeater, the first waveform during the first time domain duplexing period, where the first antenna array includes a first beamforming configuration and the second antenna array includes a second beamforming configuration. The operations of 1310 may be performed according to the methods described herein. In some examples, aspects of the operations of 1310 may be performed by a second antenna array as described with reference to FIGS. 9 through 12.

At 1315, the device may control a di-pole di-throw (DPDT) switch coupled to the first antenna array and the second antenna array during a guard period between the first time domain duplexing period and a second time domain duplexing period, where controlling the DPDT switch toggles the first antenna array from a transmit configuration to a receive configuration and the second antenna array from the receive configuration to the transmit configuration. The operations of 1315 may be performed according to the methods described herein. In some examples, aspects of the operations of 1315 may be performed by a switch controller as described with reference to FIGS. 9 through 12.

At 1320, the device may receive, at the second antenna array, a second waveform during the second time domain duplexing period. The operations of 1320 may be performed according to the methods described herein. In some examples, aspects of the operations of 1320 may be performed by a second antenna array as described with reference to FIGS. 9 through 12.

At 1325, the device may transmit, at the first antenna array, a second waveform received at the second antenna array of the wireless repeater during the second time domain duplexing period. The operations of 1325 may be performed according to the methods described herein. In some examples, aspects of the operations of 1325 may be performed by a first antenna array as described with reference to FIGS. 9 through 12.

Figure 14:
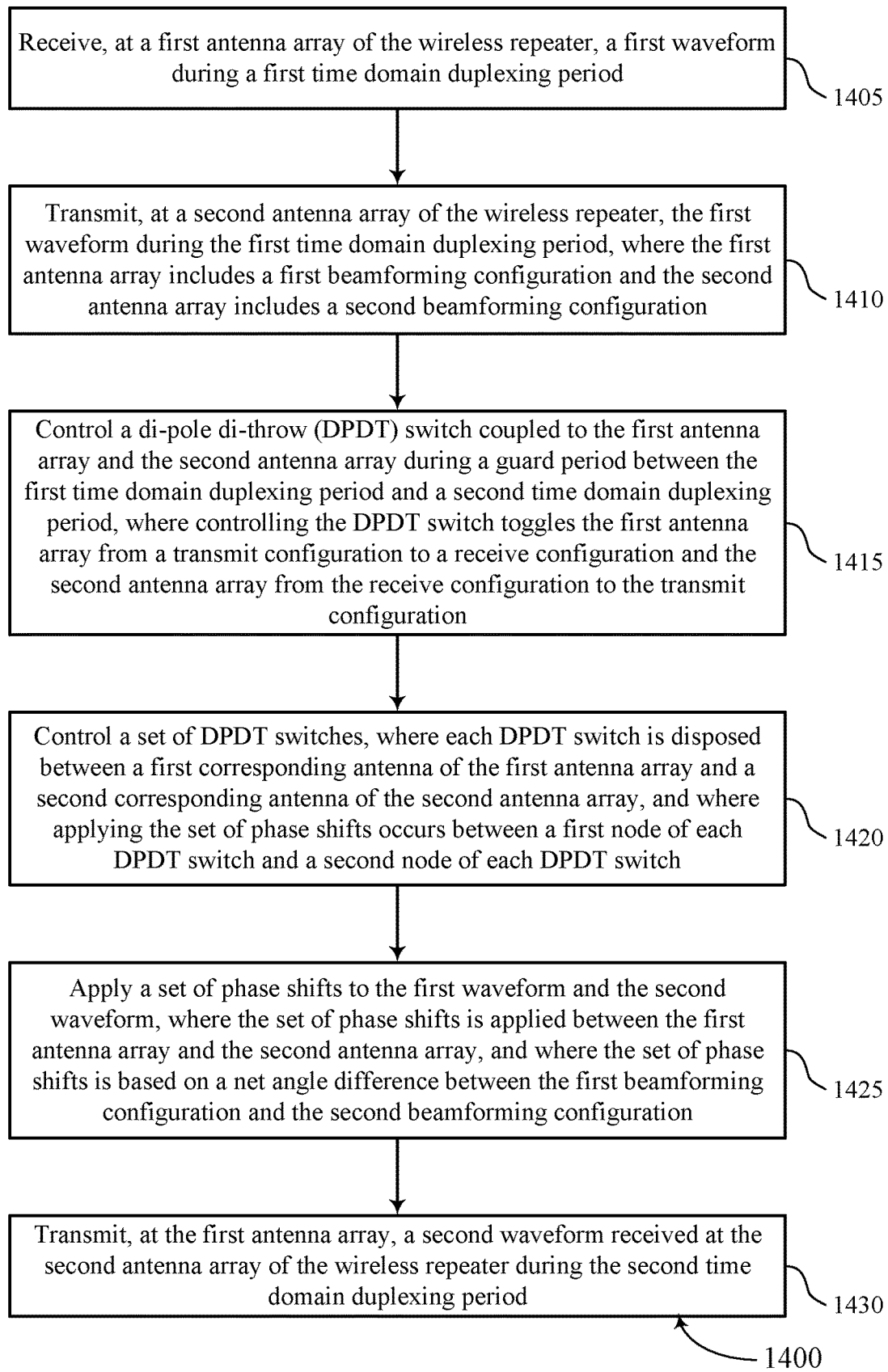

FIG. 14 shows a flowchart illustrating a method 1400 that supports bidirectional repeaters for time division duplexed millimeter wave systems in accordance with aspects of the present disclosure. The operations of method 1400 may be implemented by a device or its components as described herein. For example, the operations of method 1400 may be performed by a communications manager as described with reference to FIGS. 9 through 12. In some examples, a device may execute a set of instructions to control the functional elements of the device to perform the functions described herein. Additionally or alternatively, a device may perform aspects of the functions described herein using special-purpose hardware.

At 1405, the device may receive, at a first antenna array of the wireless repeater, a first waveform during a first time domain duplexing period. The operations of 1405 may be performed according to the methods described herein. In some examples, aspects of the operations of 1405 may be performed by a first antenna array as described with reference to FIGS. 9 through 12.

At 1410, the device may transmit, at a second antenna array of the wireless repeater, the first waveform during the first time domain duplexing period, where the first antenna array includes a first beamforming configuration and the second antenna array includes a second beamforming configuration. The operations of 1410 may be performed according to the methods described herein. In some examples, aspects of the operations of 1410 may be performed by a second antenna array as described with reference to FIGS. 9 through 12.

At 1415, the device may apply a first set of phase shifts to implement the first beamforming configuration. The operations of 1415 may be performed according to the methods described herein. In some examples, aspects of the operations of 1415 may be performed by a first phase shifting component as described with reference to FIGS. 9 through 12.

At 1420, the device may apply a second set of phase shifts to implement the second beamforming configuration. The operations of 1420 may be performed according to the methods described herein. In some examples, aspects of the operations of 1420 may be performed by a second phase shifting component as described with reference to FIGS. 9 through 12.

At 1425, the device may control a set of DPDT switches, where each DPDT switch is disposed between a first corresponding antenna of the first antenna array and a second corresponding antenna of the second antenna array. The operations of 1425 may be performed according to the methods described herein. In some examples, aspects of the operations of 1425 may be performed by a switch controller as described with reference to FIGS. 9 through 12.

At 1430, the device may combine a set of input signals corresponding to the first antenna array, where the combining occurs after routing the set of inputs through the set of DPDT switches and applying the first set of phase shifts to the set of input signals. The operations of 1430 may be performed according to the methods described herein. In some examples, aspects of the operations of 1430 may be performed by a signal combiner as described with reference to FIGS. 9 through 12.

At 1435, the device may control a di-pole di-throw (DPDT) switch coupled to the first antenna array and the second antenna array during a guard period between the first time domain duplexing period and a second time domain duplexing period, where controlling the DPDT switch toggles the first antenna array from a transmit configuration to a receive configuration and the second antenna array from the receive configuration to the transmit configuration. The operations of 1435 may be performed according to the methods described herein. In some examples, aspects of the operations of 1435 may be performed by a switch controller as described with reference to FIGS. 9 through 12.

At 1440, the device may transmit, at the first antenna array, a second waveform received at the second antenna array of the wireless repeater during the second time domain duplexing period. The operations of 1440 may be performed according to the methods described herein. In some examples, aspects of the operations of 1440 may be performed by a first antenna array as described with reference to FIGS. 9 through 12.

Figure 15:
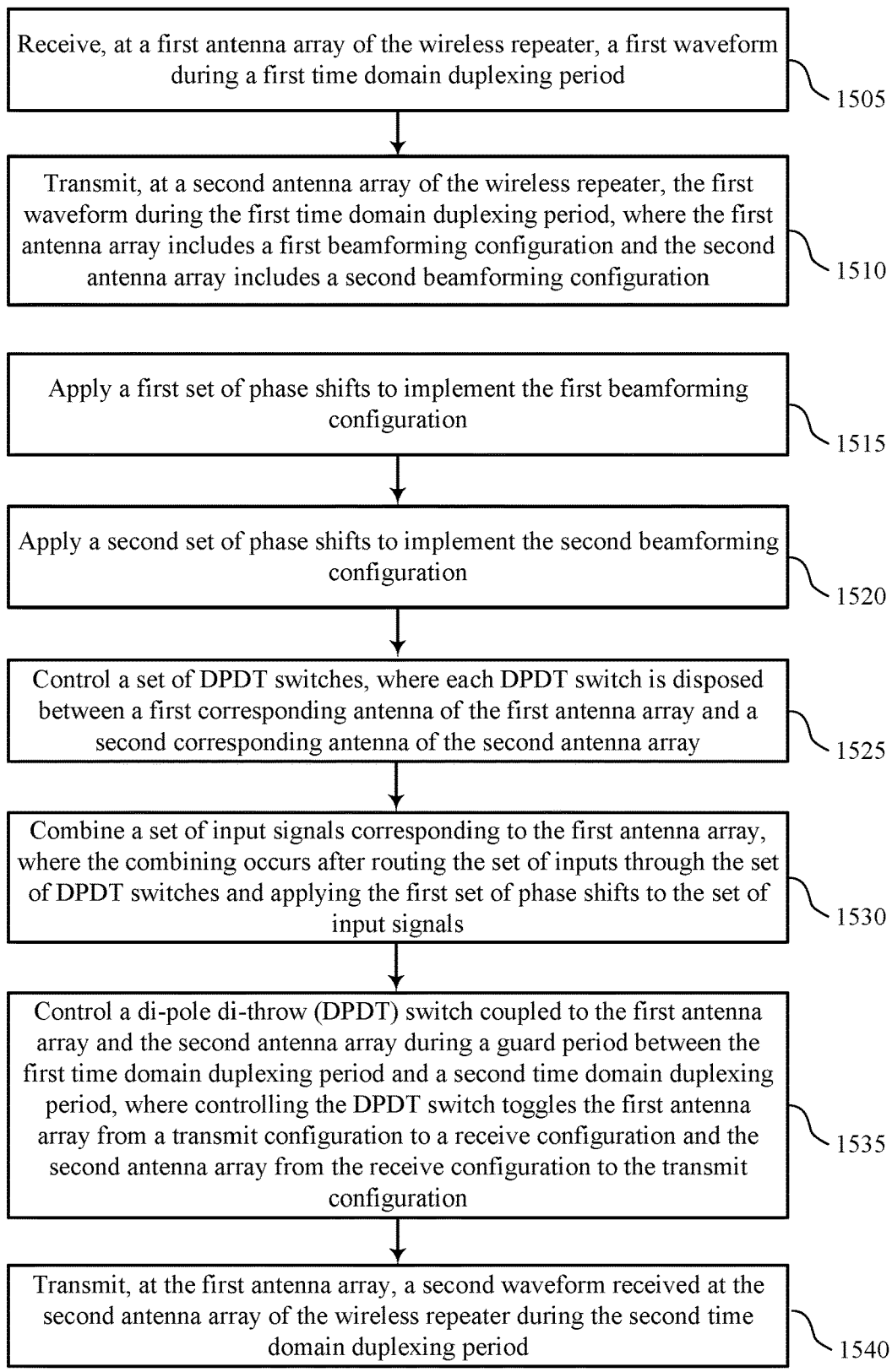

FIG. 15 shows a flowchart illustrating a method 1500 that supports bidirectional repeaters for time division duplexed millimeter wave systems in accordance with aspects of the present disclosure. The operations of method 1500 may be implemented by a device or its components as described herein. For example, the operations of method 1500 may be performed by a communications manager as described with reference to FIGS. 9 through 12. In some examples, a device may execute a set of instructions to control the functional elements of the device to perform the functions described herein. Additionally or alternatively, a device may perform aspects of the functions described herein using special-purpose hardware.

At 1505, the device may receive, at a first antenna array of the wireless repeater, a first waveform during a first time domain duplexing period. The operations of 1505 may be performed according to the methods described herein. In some examples, aspects of the operations of 1505 may be performed by a first antenna array as described with reference to FIGS. 9 through 12.

At 1510, the device may transmit, at a second antenna array of the wireless repeater, the first waveform during the first time domain duplexing period, where the first antenna array includes a first beamforming configuration and the second antenna array includes a second beamforming configuration. The operations of 1510 may be performed according to the methods described herein. In some examples, aspects of the operations of 1510 may be performed by a second antenna array as described with reference to FIGS. 9 through 12.

At 1515, the device may apply a first set of phase shifts to implement the first beamforming configuration. The operations of 1515 may be performed according to the methods described herein. In some examples, aspects of the operations of 1515 may be performed by a first phase shifting component as described with reference to FIGS. 9 through 12.

At 1520, the device may apply the first set of phase shifts to a set of input signals corresponding to the second antenna array. The operations of 1520 may be performed according to the methods described herein. In some examples, aspects of the operations of 1520 may be performed by a first phase shifting component as described with reference to FIGS. 9 through 12.

At 1525, the device may apply a second set of phase shifts to implement the second beamforming configuration. The operations of 1525 may be performed according to the methods described herein. In some examples, aspects of the operations of 1525 may be performed by a second phase shifting component as described with reference to FIGS. 9 through 12.

At 1530, the device may combine the set of input signals, where the combining occurs between the second antenna array and the DPDT switch. The operations of 1530 may be performed according to the methods described herein. In some examples, aspects of the operations of 1530 may be performed by a signal combiner as described with reference to FIGS. 9 through 12.

At 1535, the device may divide the first waveform into a set of output signals corresponding to the second antenna array, where the dividing occurs between the DPDT switch and the second antenna array. The operations of 1535 may be performed according to the methods described herein. In some examples, aspects of the operations of 1535 may be performed by a waveform divider as described with reference to FIGS. 9 through 12.

At 1540, the device may apply the second set of phase shifts to the set of output signals. The operations of 1540 may be performed according to the methods described herein. In some examples, aspects of the operations of 1540 may be performed by a second phase shifting component as described with reference to FIGS. 9 through 12.

At 1545, the device may control a di-pole di-throw (DPDT) switch coupled to the first antenna array and the second antenna array during a guard period between the first time domain duplexing period and a second time domain duplexing period, where controlling the DPDT switch toggles the first antenna array from a transmit configuration to a receive configuration and the second antenna array from the receive configuration to the transmit configuration. The operations of 1545 may be performed according to the methods described herein. In some examples, aspects of the operations of 1545 may be performed by a switch controller as described with reference to FIGS. 9 through 12.

At 1550, the device may transmit, at the first antenna array, a second waveform received at the second antenna array of the wireless repeater during the second time domain duplexing period. The operations of 1550 may be performed according to the methods described herein. In some examples, aspects of the operations of 1550 may be performed by a first antenna array as described with reference to FIGS. 9 through 12.

Figure 16:
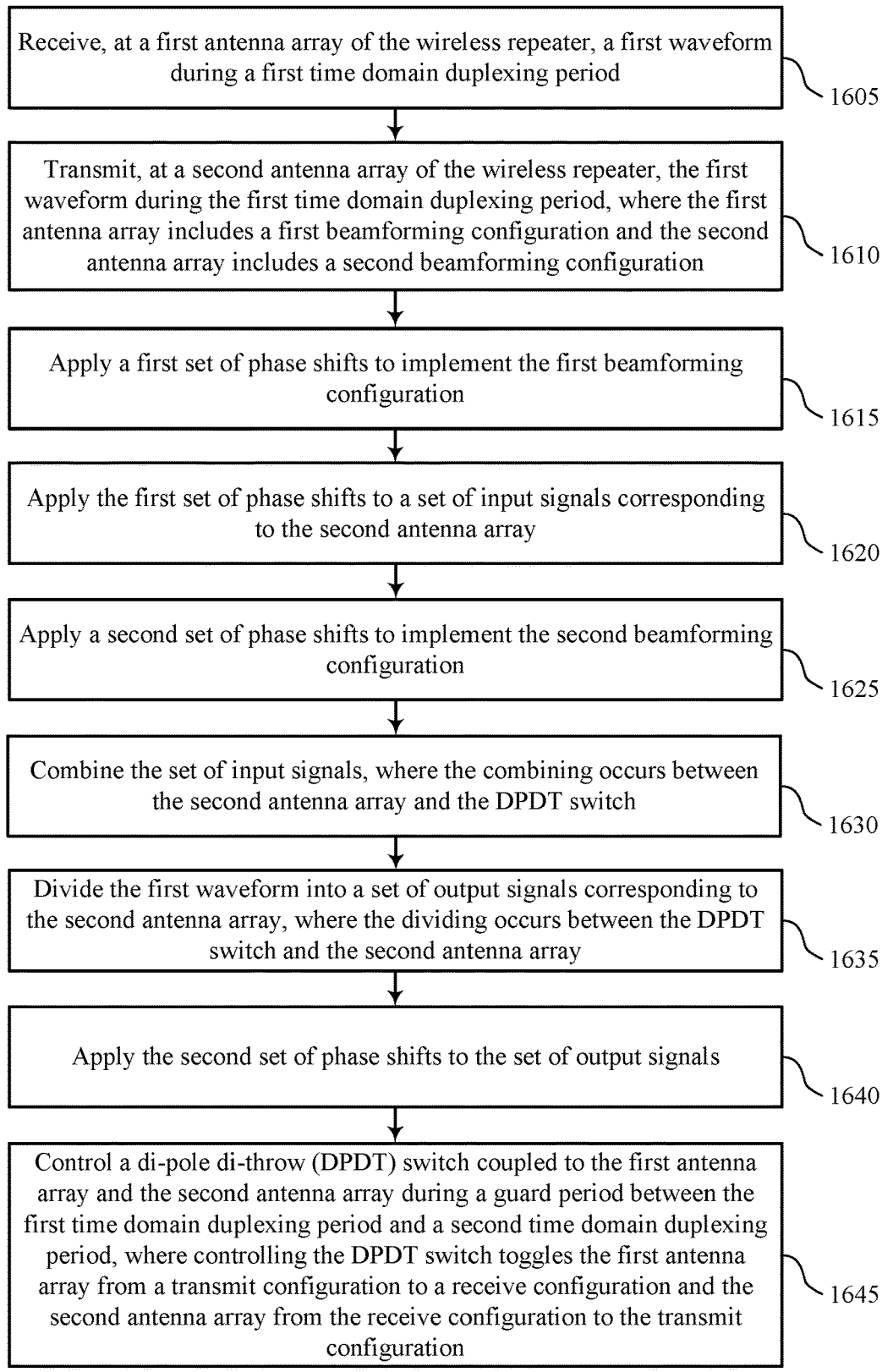

FIG. 16 shows a flowchart illustrating a method 1600 that supports bidirectional repeaters for time division duplexed millimeter wave systems in accordance with aspects of the present disclosure. The operations of method 1600 may be implemented by a device or its components as described herein. For example, the operations of method 1600 may be performed by a communications manager as described with reference to FIGS. 9 through 12. In some examples, a device may execute a set of instructions to control the functional elements of the device to perform the functions described below. Additionally or alternatively, a device may perform aspects of the functions described below using special-purpose hardware.

At 1605, the device may receive, at a first antenna array of the wireless repeater, a first waveform during a first time domain duplexing period. The operations of 1605 may be performed according to the methods described herein. In some examples, aspects of the operations of 1605 may be performed by a first antenna array as described with reference to FIGS. 9 through 12.

At 1610, the device may transmit, at a second antenna array of the wireless repeater, the first waveform during the first time domain duplexing period, where the first antenna array includes a first beamforming configuration and the second antenna array includes a second beamforming configuration. The operations of 1610 may be performed according to the methods described herein. In some examples, aspects of the operations of 1610 may be performed by a second antenna array as described with reference to FIGS. 9 through 12.

At 1615, the device may control a di-pole di-throw (DPDT) switch coupled to the first antenna array and the second antenna array during a guard period between the first time domain duplexing period and a second time domain duplexing period, where controlling the DPDT switch toggles the first antenna array from a transmit configuration to a receive configuration and the second antenna array from the receive configuration to the transmit configuration. The operations of 1615 may be performed according to the methods described herein. In some examples, aspects of the operations of 1615 may be performed by a switch controller as described with reference to FIGS. 9 through 12.

At 1620, the device may control a set of DPDT switches, where each DPDT switch is disposed between a first corresponding antenna of the first antenna array and a second corresponding antenna of the second antenna array, and where applying the set of phase shifts occurs between a first node of each DPDT switch and a second node of each DPDT switch. The operations of 1620 may be performed according to the methods described herein. In some examples, aspects of the operations of 1620 may be performed by a switch controller as described with reference to FIGS. 9 through 12.

At 1625, the device may apply a set of phase shifts to the first waveform and the second waveform, where the set of phase shifts is applied between the first antenna array and the second antenna array, and where the set of phase shifts is based on a net angle difference between the first beamforming configuration and the second beamforming configuration. The operations of 1625 may be performed according to the methods described herein. In some examples, aspects of the operations of 1625 may be performed by a phase shifting component as described with reference to FIGS. 9 through 12.

At 1630, the device may transmit, at the first antenna array, a second waveform received at the second antenna array of the wireless repeater during the second time domain duplexing period. The operations of 1630 may be performed according to the methods described herein. In some examples, aspects of the operations of 1630 may be performed by a first antenna array as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a wireless repeater, comprising:
    receiving, at a first antenna array of the wireless repeater, a first waveform during a first time domain duplexing period;
    transmitting, at a second antenna array of the wireless repeater, the first waveform during the first time domain duplexing period, wherein the first antenna array comprises a first beamforming configuration and the second antenna array comprises a second beamforming configuration;
    controlling a di-pole di-throw (DPDT) switch coupled to the first antenna array and the second antenna array during a guard period between the first time domain duplexing period and a second time domain duplexing period, wherein controlling the DPDT switch toggles the first antenna array from a transmit configuration to a receive configuration and the second antenna array from the receive configuration to the transmit configuration;
    receiving, at the second antenna array, a second waveform during the second time domain duplexing period; and
    transmitting, at the first antenna array, the second waveform during the second time domain duplexing period.

2. The method of claim 1, further comprising:
    applying a first set of phase shifts to implement the first beamforming configuration; and
    applying a second set of phase shifts to implement the second beamforming configuration.

3. The method of claim 2, wherein controlling the DPDT switch comprises:
    controlling a plurality of DPDT switches, wherein each DPDT switch is disposed between a first corresponding antenna of the first antenna array and a second corresponding antenna of the second antenna array.

4. The method of claim 3, wherein receiving the first waveform comprises:
    combining a plurality of input signals corresponding to the first antenna array, wherein the combining occurs after routing the plurality of input signals through the plurality of DPDT switches and applying the first set of phase shifts to the plurality of input signals.

5. The method of claim 3, wherein transmitting the first waveform comprises:
    dividing the first waveform into a plurality of output signals;
    applying the second set of phase shifts to the plurality of output signals; and
    routing the plurality of output signals through the plurality of DPDT switches to the second antenna array.

6. The method of claim 3, wherein receiving the second waveform comprises:
    combining a plurality of input signals corresponding to the second antenna array, wherein the combining occurs after routing the plurality of input signals through the plurality of DPDT switches and applying the second set of phase shifts to the plurality of input signals.

7. The method of claim 3, wherein transmitting the second waveform comprises:
    dividing the second waveform into a plurality of output signals;
    applying the first set of phase shifts to the plurality of output signals; and
    routing the plurality of output signals through the plurality of DPDT switches to the first antenna array.

8. The method of claim 2, wherein receiving the first waveform comprises:
    applying the first set of phase shifts to a plurality of input signals corresponding to the first antenna array; and
    combining the plurality of input signals between the first antenna array and the DPDT switch.

9. The method of claim 2, wherein transmitting the first waveform comprises:
dividing the first waveform into a plurality of output signals corresponding to the second antenna array, wherein the dividing occurs between the DPDT switch and the second antenna array; and
applying the second set of phase shifts to the plurality of output signals.

10. The method of claim 2, wherein receiving the second waveform comprises:
applying the first set of phase shifts to a plurality of input signals corresponding to the second antenna array; and
combining the plurality of input signals, wherein the combining occurs between the second antenna array and the DPDT switch.

11. The method of claim 2, wherein transmitting the second waveform comprises:
dividing the second waveform into a plurality of output signals corresponding to the first antenna array, wherein the dividing occurs between the DPDT switch and the first antenna array; and
applying the second set of phase shifts to the plurality of output signals.

12. The method of claim 1, further comprising:
applying a set of phase shifts to the first waveform and the second waveform, wherein the set of phase shifts is applied between the first antenna array and the second antenna array, and wherein the set of phase shifts is based at least in part on a net angle difference between the first beamforming configuration and the second beamforming configuration.

13. The method of claim 12, wherein controlling the DPDT switch comprises:
controlling a plurality of DPDT switches, wherein each DPDT switch is disposed between a first corresponding antenna of the first antenna array and a second corresponding antenna of the second antenna array, and wherein applying the set of phase shifts occurs between a first node of each DPDT switch and a second node of each DPDT switch.

14. The method of claim 1, wherein controlling the DPDT switch comprises:
receiving a sideband message from a base station indicating a timing of the guard period; and
activating the DPDT switch based at least in part on the sideband message.

15. The method of claim 1, further comprising:
amplifying the first waveform and the second waveform between a first node of the DPDT switch and second node of the DPDT switch.

16. The method of claim 15, wherein amplifying the first waveform and the second waveform between the first node of the DPDT switch and the second node of the DPDT switch comprises:
passing the first waveform and the second waveform through one or more of: a low noise amplifier stage, a power amplifier driver stage, or a power amplifier stage.

17. A wireless repeater, comprising:
a first antenna array comprising a first beamforming configuration;
a second antenna array comprising a second beamforming configuration; and
a di-pole di-throw (DPDT) switch coupled to the first antenna array and the second antenna array; and
a controller coupled to the DPDT switch, wherein the controller is configured to control the DPDT switch to toggle the first antenna array from a transmit configuration to a receive configuration and the second antenna array from the receive configuration to the transmit configuration, wherein the DPDT switch is controlled during a guard period between a first time domain duplexing period and a second time domain duplexing period.

18. The wireless repeater of claim 17, further comprising:
a set of phase shifters configured to apply a set of phase shifts to a plurality of input signals corresponding to the first antenna array, wherein the set of phase shifts is applied to the plurality of input signals after passing through the DPDT switch.

19. The wireless repeater of claim 18, further comprising:
a combiner coupled with a phase shifter of the set of phase shifters, the combiner configured to combine the plurality of input signals corresponding to the first antenna array to produce a waveform, wherein the combining occurs after passing through the DPDT switch and applying the set of phase shifts to the plurality of input signals.

20. The wireless repeater of claim 19, further comprising:
a divider coupled with the combiner, the divider configured to divide the waveform into a plurality of output signals.

21. The wireless repeater of claim 20, further comprising:
a second set of phase shifters coupled with the divider, the second set of phase shifters configured to apply a second set of phase shifts to the plurality of input signals, the second set of phase shifters further configured to pass the plurality of input signals to the DPDT switch and to the second antenna array.

22. The wireless repeater of claim 17, further comprising:
a set of phase shifters configured to apply a set of phase shifts to a plurality of input signals corresponding to the first antenna array, wherein the set of phase shifts is applied to the plurality of input signals before passing through the DPDT switch.

23. The wireless repeater of claim 22, wherein the set of phase shifters is further configured to apply a second set of phase shifts to a plurality of output signals, wherein the second set of phase shifts is applied to the plurality of output signals after passing through the DPDT switch.

24. The wireless repeater of claim 22, further comprising:
a combiner coupled with the set of phase shifters and configured to combine the plurality of input signals to produce a waveform before passing the waveform to the DPDT switch.

25. The wireless repeater of claim 24, wherein the combiner is further configured to divide the waveform into a plurality of output signals after passing through the DPDT switch.

26. The wireless repeater of claim 17, wherein the first antenna array comprises a first beamforming configuration and the second antenna array comprises a second beamforming configuration.

27. The wireless repeater of claim 26, further comprising:
a set of phase shifters configured to apply a set of phase shifts to a plurality of input signals corresponding to the first antenna array, wherein the set of phase shifts is applied between the first antenna array and the second antenna array, and wherein the set of phase shifts is based at least in part on a net angle difference between the first beamforming configuration and the second beamforming configuration.

28. The wireless repeater of claim 17, further comprising:
a power amplifier coupled with the DPDT switch, wherein the power amplifier is configured to amplify a plurality of output signals corresponding to the second antenna array, wherein the power amplifier amplifies the plurality of output signals before passing through the DPDT switch.

29. The wireless repeater of claim 17, further comprising:
a power amplifier coupled with the DPDT switch, wherein the power amplifier is configured to amplify a first waveform corresponding to the first antenna array, wherein the power amplifier amplifies the first waveform after passing through the DPDT switch.

30. The wireless repeater of claim 17, further comprising:
a low noise amplifier coupled with the DPDT switch, wherein the low noise amplifier is configured amplify a plurality of input signals corresponding to the first antenna array, wherein the low noise amplifier amplifies the plurality of input signals after the plurality of input signals pass through the DPDT switch.

31. An apparatus for wireless communications at a wireless repeater, comprising:
means for receiving, at a first antenna array of the wireless repeater, a first waveform during a first time domain duplexing period;
means for transmitting, at a second antenna array of the wireless repeater, the first waveform during the first time domain duplexing period, wherein the first antenna array comprises a first beamforming configuration and the second antenna array comprises a second beamforming configuration;
means for controlling a di-pole di-throw (DPDT) switch coupled to the first antenna array and the second antenna array during a guard period between the first time domain duplexing period and a second time domain duplexing period, wherein controlling the DPDT switch toggles the first antenna array from a transmit configuration to a receive configuration and the second antenna array from the receive configuration to the transmit configuration;
means for receiving, at the second antenna array, a second waveform during the second time domain duplexing period; and
means for transmitting, at the first antenna array, the second waveform during the second time domain duplexing period.

32. A non-transitory computer-readable medium storing code for wireless communications at a wireless repeater, the code comprising instructions executable by a processor to:
receive, at a first antenna array of the wireless repeater, a first waveform during a first time domain duplexing period;
transmit, at a second antenna array of the wireless repeater, the first waveform during the first time domain duplexing period, wherein the first antenna array comprises a first beamforming configuration and the second antenna array comprises a second beamforming configuration;
control a di-pole di-throw (DPDT) switch coupled to the first antenna array and the second antenna array during a guard period between the first time domain duplexing period and a second time domain duplexing period, wherein controlling the DPDT switch toggles the first antenna array from a transmit configuration to a receive configuration and the second antenna array from the receive configuration to the transmit configuration;
receive, at the second antenna array, a second waveform during the second time domain duplexing period; and
transmit, at the first antenna array, the second waveform during the second time domain duplexing period.

* * * * *